US008035843B2

(12) United States Patent
Ando et al.

(10) Patent No.: US 8,035,843 B2
(45) Date of Patent: Oct. 11, 2011

(54) RECORDING MEDIUM PROCESSING DEVICE, PRINTING METHOD, AND COMPUTER PROGRAM

(75) Inventors: Makoto Ando, Tokyo (JP); Tatsumi Ito, Tokyo (JP); Koji Ashizaki, Tokyo (JP); Takahiro Toyoda, Tokyo (JP); Minoru Takeda, Tokyo (JP); Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1225 days.

(21) Appl. No.: 11/732,293

(22) Filed: Apr. 3, 2007

(65) Prior Publication Data

US 2007/0236722 A1 Oct. 11, 2007

(30) Foreign Application Priority Data

Apr. 7, 2006 (JP) ................................. 2006-106319

(51) Int. Cl.
*G06K 15/00* (2006.01)
*G06F 3/12* (2006.01)

(52) U.S. Cl. ...................................... 358/1.18; 358/1.15

(58) Field of Classification Search .................... 358/1.1, 358/1.16, 1.17, 1.18, 1.15, 1.13, 1.14, 1.9, 358/1.11, 1.12, 434, 440, 400, 401, 404, 358/407, 444, 468; 347/1, 2, 224, 5; 369/275.3, 369/275.4, 274, 273, 272.1; 428/64.1, 64.2, 428/64.4, 64.6; 715/273, 274, 243, 235
See application file for complete search history.

(56) References Cited

U.S. PATENT DOCUMENTS

| 2002/0105899 A1* | 8/2002 | Lin .............................. 369/272 |
| 2006/0233997 A1* | 10/2006 | Takahashi et al. ........... 428/64.1 |
| 2007/0247479 A1* | 10/2007 | Ando et al. ...................... 347/2 |

FOREIGN PATENT DOCUMENTS

| JP | 05182411 A * | 7/1993 |
| JP | 06-284370 | 7/1994 |
| JP | 11-134648 | 5/1999 |
| JP | 2002-292939 A | 10/2002 |
| JP | 2005-182980 A | 7/2005 |
| JP | 2005-339715 A | 12/2005 |

\* cited by examiner

*Primary Examiner* — Dov Popovici
(74) *Attorney, Agent, or Firm* — Wolf, Greenfield & Sacks, P.C.

(57) ABSTRACT

A recording medium processing device includes a printing section capable of printing visible information on a non-recording side of a recording medium, a data processing section for retrieving print data in which one recording medium and visible information printed and/or to be printed on the non-recording side of the recording medium are associated with each other, and a print configuration section for determining a printing area of the visible information to be printed on the non-recording side of the one recording medium based on the print data retrieved by the data processing section.

9 Claims, 20 Drawing Sheets

260

|  | X COORDINATE | Y COORDINATE | X SIZE | Y SIZE | FILE NAME |
|---|---|---|---|---|---|
| LABEL INFORMATION A | 400 | 100 | 700 | 180 | Data_001.JPG |
| LABEL INFORMATION B | 400 | 300 | 700 | 180 | Data_002.JPG |
| LABEL INFORMATION C | 400 | 500 | 700 | 180 | Data_003.JPG |
| LABEL INFORMATION D | 400 | 1000 | 700 | 180 | Data_004.JPG |

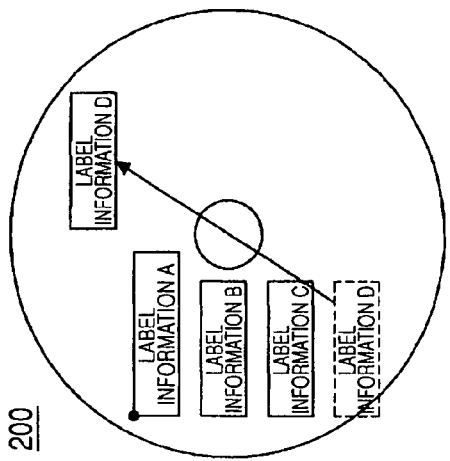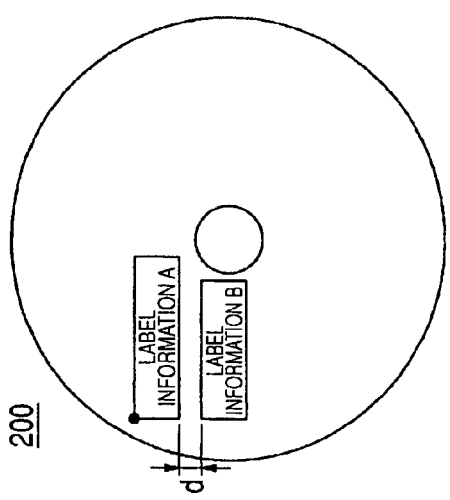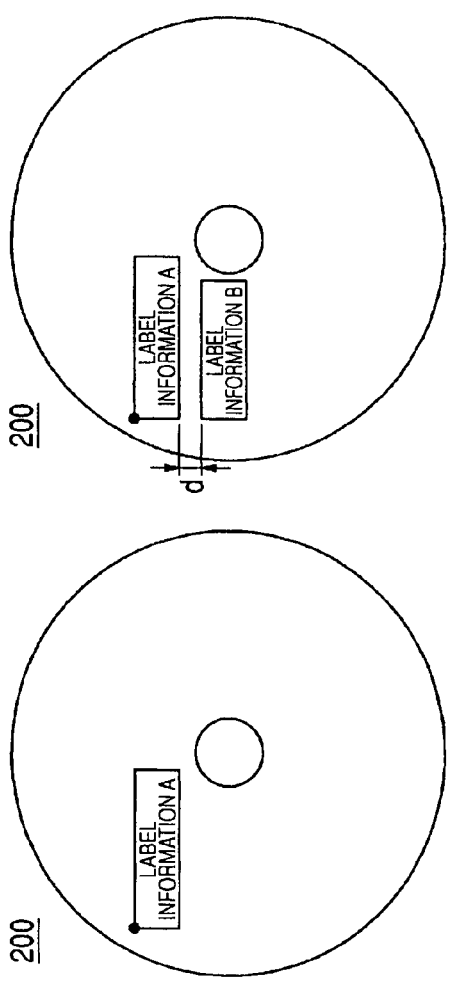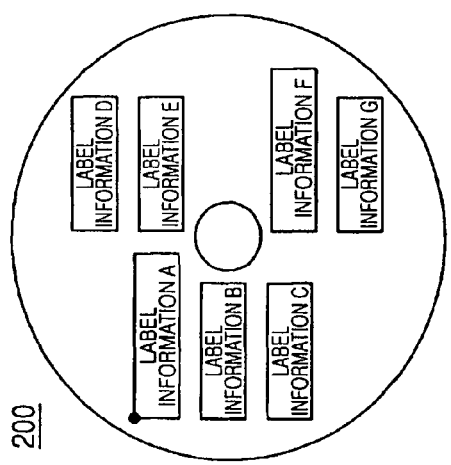

| PRINT SECTOR NUMBER | PRINT STATUS | PRINT CONTENTS |
|---|---|---|
| 0 | DONE | ANCIENT HERITAGE I |
| 1 | DONE | ANCIENT HERITAGE II |
| 2 | DONE | ANCIENT HERITAGE III |
| 3 | DONE | ANCIENT HERITAGE IV |
| 4 | NOT YET | |
| 5 | NOT YET | |
| 6 | NOT YET | |
| 7 | NOT YET | |
| 8 | NOT YET | |
| 9 | NOT YET | |
| 10 | NOT YET | |
| 11 | NOT YET | |

RECORDING MEDIUM PROCESSING DEVICE, PRINTING METHOD, AND COMPUTER PROGRAM

CROSS REFERENCES TO RELATED APPLICATIONS

The present invention contains subject matter related to Japanese Patent Application JP 2006-106319 filed in the Japan Patent Office on Apr. 7, 2006, the entire contents of which being incorporated herein by reference.

BACKGROUND OF THE INVENTION

1. Technical Field

The present invention relates to a recording medium processing device, a printing method, and a computer program used when printing visible information on a non-recording side of a recording medium.

2. Related Art

In recent years, optical disks, the optical recording mediums, have rapidly been spread as mediums for recording pictures and sounds in a digital format. In particular, the optical disks provided with printable sides (non-recording sides) which can be printed with inkjet printers have been attracting attention because information (visible information) relating to the contents recorded on the optical disks can be described on the surfaces of the disks.

As a device for printing visible information on such an optical disk, for example, there can be cited an optical disk drive having a printing function (see JP-A-11-134648). After recording data on a recording side of the optical disk with an optical pickup, the optical disk drive can print visible information representing the content of the data on non-recording side using a thermal method or a inkjet method, assuming that no visible information is printed on the non-recording side.

SUMMARY OF THE INVENTION

However, in the case in which data and the visible information are to be added to the optical disk on which data has already been recorded and the visible information representing the content of the data has also already been printed using the optical disk drive in the related art, there have been some cases in which the additional visible information is printed overlapping the previously printed visible information. In other words, since the optical disk drive in the related art cannot recognize a non-printed area of the optical disk, it has problematically printed the visible information on a printed area other than the non-printed area in an overlapping manner.

Therefore, in view of the above problem, it is desirable to provide a novel and improved recording medium processing device, printing method, and computer program capable of additionally printing new visible information on a non-printed area on a non-recording side of a recording medium irrespective of whether or not a printed area of visible information exists on the non-recording side.

According to an embodiment of the invention, there is provided a recording medium processing device including a printing section capable of printing visible information on a non-recording side of a recording medium, a data processing section for retrieving print data in which one recording medium and visible information printed and/or to be printed on the non-recording side of the recording medium are associated with each other, and a print configuration section for determining a printing area of the visible information to be printed on the non-recording side of the one recording medium based on the print data retrieved by the data processing section.

According to the above configuration, the data processing section loads the print data showing the printed area and the non-printed area in the non-recording side of the recording medium, and the print configuration section determines printing position of the visible information to be printed considering the printed area. Therefore, the printing section can additionally print the visible information utilizing the non-printed area irrespective of presence or absence of the printed area in the non-recording side of the recording medium.

The print data can be recorded on the recording side of one recording medium. According to the above configuration, the print data can be retrieved from the recording surface of the one recording medium when printing the visible information on the non-recording side of the one recording medium.

The recording medium processing device can further include a recording section for recording the print data. According to the above configuration, the print data of the recording side of the one recording medium can be updated before printing or after printing the visible information on the non-recording side of the one recording medium.

The print data can be image data of the non-recording side including the visible information printed and/or to be printed on the non-recording side of the recording medium. According to the above configuration, the print configuration section can develop the image data of the visible information already printed on the recording medium to judge the printed area.

The print data can be printing area data indicating the area of the visible information printed and/or to be printed on the non-recording side of the recording medium. According to the above configuration, the print configuration section can judge the printed area of the non-recording side of the recording medium while suppressing the amount of the print data.

The print data can be partitioning data representing whether or not the visible information has already been printed and/or will be printed for every sector of the previously partitioned non-recording side of the recording medium. According to the above configuration, the print configuration section can judge the printed area of the non-recording side of the recording medium while suppressing the amount of the print data and without requiring particular calculation.

Further, according to another embodiment of the invention, there is provided a printing method including the steps of inputting an instruction of printing visible information on a non-recording side of a recording medium, retrieving print data in which one recording medium and visible information printed and/or to be printed on the non-recording side of the recording medium are associated with each other, and determining a printing area of visible information to be printed on the non-recording side of the one recording medium based on the print data.

According to the above configuration, the data processing section loads the printed area and the non-printed area in the non-recording side of the recording medium from the recording side of the recording medium, and the print configuration section determines printing position of the visible information to be printed considering the printed area. Therefore, the printing section can print the visible information without overlapping the printed area of the non-recording side of the recording medium.

Further, according to another embodiment of the invention, there is provided a computer program for instructing a computer to function as a recording medium processing device including a printing section capable of printing visible information on a non-recording side of a recording medium, a data processing section for retrieving print data in which one recording medium and visible information printed and/or to be printed on the non-recording side of the recording medium are associated with each other, and a print configuration section for determining a printing area of the visible information to be printed on the non-recording side of the one recording medium based on the print data retrieved by the data processing section.

According to the above configuration, the data processing section loads the printed area and the non-printed area in the non-recording side of the recording medium from the recording side of the recording medium, and the print configuration section determines printing position of the visible information to be printed considering the printed area. Therefore, the printing section can print the visible information utilizing the non-printed area irrespective of presence or absence of the printed area in the non-recording side of the recording medium.

As described above, according to the recording medium processing device, the printing method, and the computer program of the embodiments of the invention, new visible information can additionally be printed in the non-printed area on the non-recording side of the recording medium irrespective of whether or not the printed area of the visible information exist on the non-recording side of the recording medium.

BRIEF DESCRIPTION OF THE DRAWINGS

FIGS. 21A through 21D are diagrams showing conditions through which the layout generating section sequentially adds the description of the label information.

DESCRIPTION OF THE EMBODIMENTS

Figure 1:
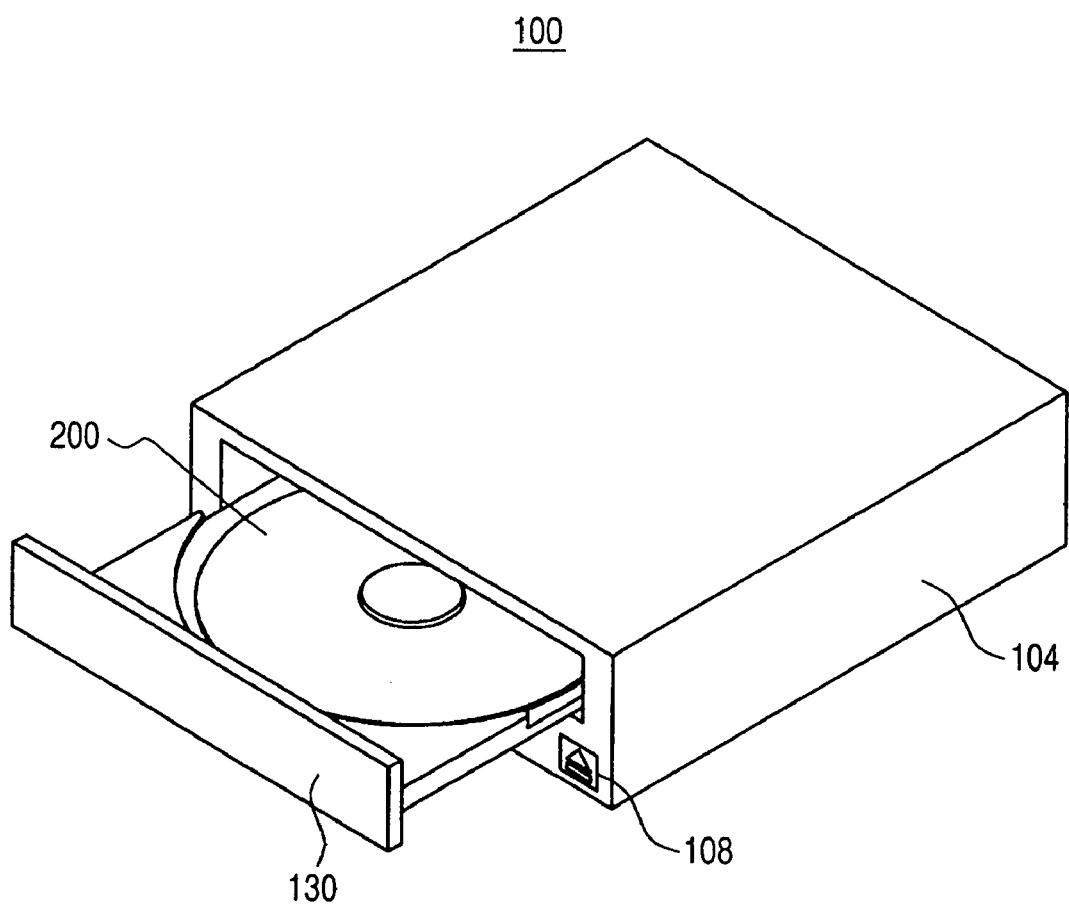
FIG. 1 is an external view of an optical disk drive as an optical recording/reproducing device according to the present embodiment.

Hereinafter, preferred embodiments of the present invention will be described in detail with reference to the accompanying drawings. It should be noted that in the specification and the drawings, configuration elements having substantially the same functional configurations are denoted with the same reference numerals, and redundant explanations are thus omitted.

First Embodiment

Firstly, an optical disk drive according to a first embodiment of the invention will be explained.

FIG. 1 is an external view of an optical disk drive 100 as a recording medium processing device according to the present embodiment. The optical disk drive 100 includes a housing 104, an opening/closing switch 108, and a tray 130. It should be noted that in the illustrated example, there is shown the condition in which an optical disk 200 is mounted on the optical disk drive 100 as a recording medium. The optical disk drive 100 is a recording and/or reproducing device for recording data signal on and/or reproducing the data signal from the optical disk 200.

The housing 104 covers every configuration element inside the optical disk drive 100 to protect each of the configuration elements from adhesion with foreign matters such as dusts and external factors such as a flow of air. Although in the illustrated example, there is shown the case with the housing 104 having a cuboid shape, a cylindrical shape can also be adopted, and in the case in which the optical disk drive 100 is built in an information processing devices such as a PC or a recorder, the housing 104 can be eliminated.

The opening/closing switch 108 is disposed on, for example, a front surface of the housing 104, and causes an opening/closing operation of the tray 130 in response to a pressing operation by the user. The tray 130 has a shape capable of mounting the optical disk 200, and allows the user to set and remove the optical disk 200 by the opening/closing operation described above.

Further, if the optical disk drive 100 is built in the information processing device such as a PC or a recorder, it is possible to have a configuration that the tray 130 performs the opening/closing operation in accordance with an opening/closing instruction from the PC or the recorder.

It should be noted that the recording medium is not limited to the optical disk 200, but can also be a recording medium such as a magnetic disk, a magneto-optic disk, or a flash memory. Further, in accordance with the kind of recording medium, the recording medium processing device can be a magnetic disk drive or a magneto-optic disk drive.

Hereinafter, the inside configuration of the optical disk drive 100 according to the present embodiment will now be explained.

Figure 2:
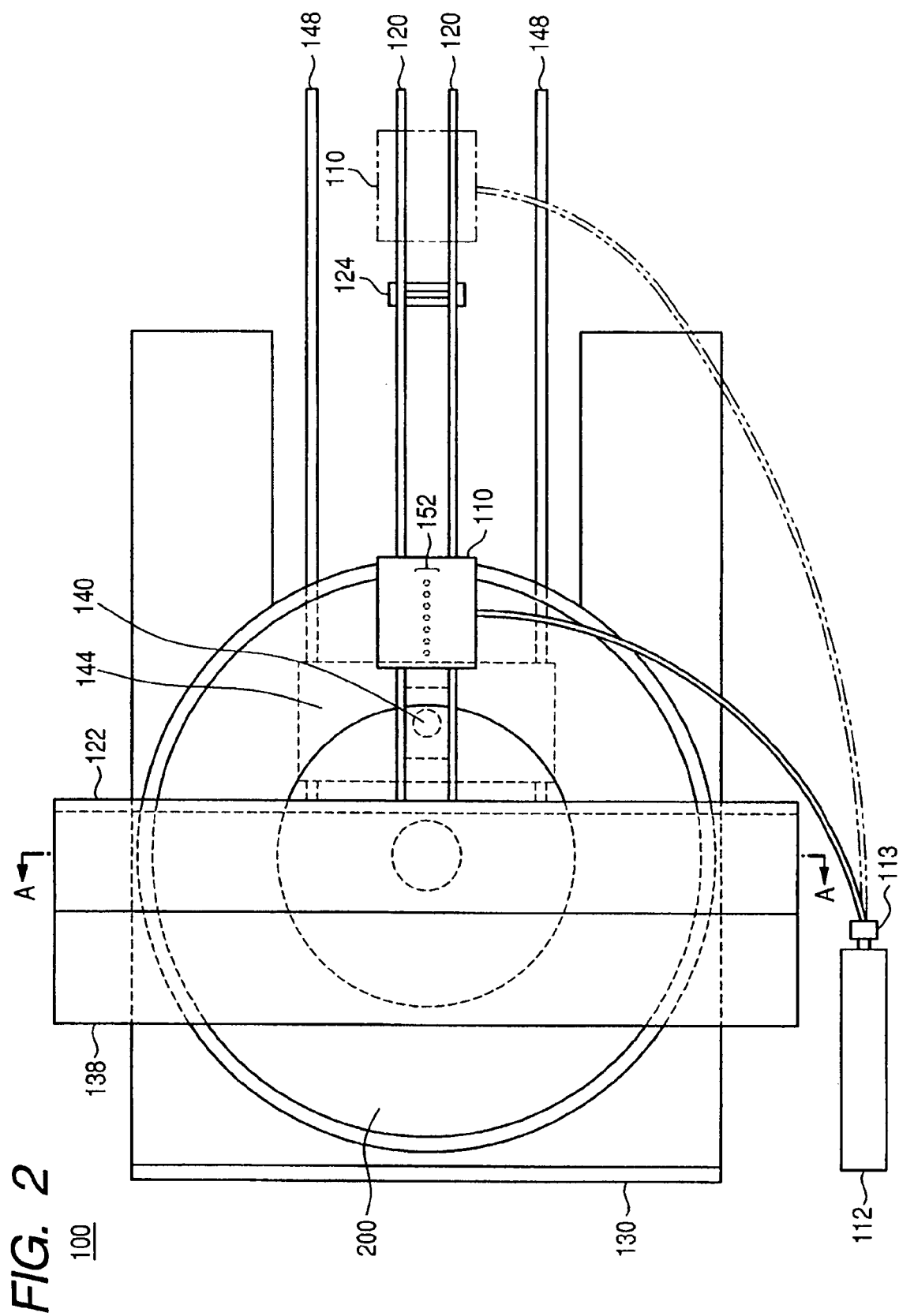
FIG. 2 is a plan view of the inside configuration of the optical disk drive according to the present embodiment.
Figure 3:
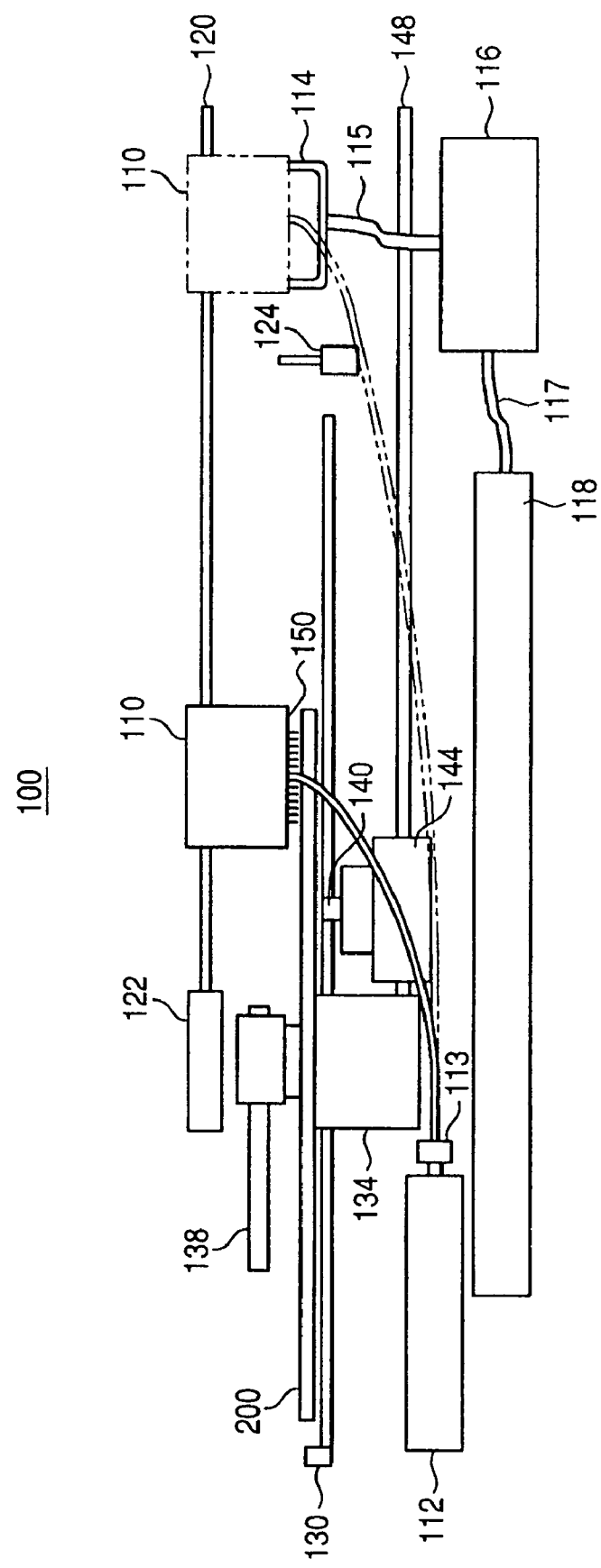
FIG. 3 is a side view of the inside configuration of the optical disk drive according to the present embodiment.

FIG. 2 is a plan view showing the inside configuration of the optical disk drive according to the present embodiment. FIG. 3 is a side view showing the inside configuration of the optical disk drive according to the present embodiment.

The optical disk drive 100 includes a printing section for printing the label information as the visible information such as characters and images on the label side as the non-recording side of the optical disk 200, and a data processing section for recording the data signal on the recording side of the optical disk 200 or reproducing the data signal from the recording side of the optical disk 200.

The printing section includes a print head 110, an ink cartridge 112, a head cap 114, a suction pump 116, a waste ink absorber 118, a first guide shaft 120, a shaft supporting section 122, and a blade 124.

The print head 110 includes a nozzle row 152 for ejecting ink in a nozzle surface 150 opposed to the optical disk 200, and ejects ink from the nozzles using an inkjet method at an ink ejection frequency of, for example, 8.4 kHz. It should be noted that the inkjet method denotes a method of ejecting ink from the nozzle row 152 as a microscopic droplet to attach the droplet to a sheet.

Further, the print head 110 is retracted outside the optical disk 200 in a print standby state, or disposed above the optical disk 200 in a printing state. Further, the print head 110 has a function of performing dummy ejection of ink before or after printing in order for discharging thickened ink, bubbles, foreign matters, and so on from the nozzles.

An ink cartridge 112 contains predetermined colors of ink to supply the print head 110 with the ink. In more detail, the ink cartridge 112 is a container made of resin and having a cylindrical shape, and houses a porous body such as sponge or ceramic. Further, the ink is stored by capillary attraction of the porous body. The ink cartridge 112 supplies the print head 110 with ink through a connecting section 113. Since the ink cartridge 112 as described above is detachably attached at the connecting section 113, the ink cartridge 112 can easily be exchanged if the ink runs out.

The head cap 114 is attached to the nozzle surface 150 of the print head 110 in the print standby state, thus preventing the ink contained in the print head 110 from drying and foreign matters such as dusts from being adhered to the nozzle surface 150. In the printing state, on the other hand, the head cap 114 is detached from the print head 110. Further, the head cap 114 is provided with a porous layer, thus having a function of temporarily storing the ink discharged by the dummy ejection by the print head 110. It should be noted that there is provided a valve operating mechanism (not shown) which can adjust the pressure of the inside space of the head cap 114 so as to be the atmospheric pressure when the dummy ejection is performed.

The suction pump 116 is connected to the head cap 114 through a tube 115, and is capable of applying negative-pressure to the inside space of the head cap 114 to suction the ink inside the print head 110 while the head cap 114 is attached to the print head 110. Further, the ink discharged by the dummy ejection by the print head 110 and temporarily held in the head cap 114 can also be suctioned.

The waste ink absorber 118 is connected to the suction pump 116 through a tube 117, and the ink suctioned by the suction pump 116 is discarded in the waste ink absorber 118.

The first guide shaft 120 moves the print head 110 in the radial direction of the optical disk 200. This movement of the print head 110 can also be achieved by the first guide shaft 120 using a ball screw feed mechanism, a rack-and-pinion mechanism, belt feed mechanism, a wire feed mechanism, or other mechanisms. The shaft supporting section 122 supports one end of the first guide shaft 120.

The blade 124 is disposed between the print standby position and the printing position of the print head 110, and wipes the nozzle surface 150 of the print head 110 while the print head 110 moves from the print standby position to the printing position or while the print head 110 moves from the printing position to the print standby position, thus removing foreign matters and ink adhered to the nozzle surface 150. It should be noted that by moving the blade 124 up and down, whether or not the nozzle surface 150 is wiped can be selected.

Further, the data processing section includes a tray 130, a spindle motor 134, a chucking section 138, an optical pickup 140, a moving stage 144, and a second guide shaft 148.

The tray 130 has a shape for mounting the optical disk 200, and moves left and right in FIG. 2 allowing mounting and removing of the optical disk 200.

The spindle motor 134 rotates in accordance with a control signal input from a motor drive circuit (not shown), and functions as a driver for the optical disk 200. The rotational speed of the spindle motor 134 can be set differently between the data signal processing and the label information printing.

The chucking section 138 has a contact with an upper part of the spindle motor 134. The optical disk 200 mounted on the tray 130 rotates in conjunction with the rotation of the spindle motor 134, and is lifted up from the tray 130. The chucking section 138 has a function of preventing the optical disk 200 from being lifted and detached from the tray 130 as described above.

The optical pickup 140 is a module of an optical system including a light source, a beam splitter for deflecting a laser beam entering from the light source, an irradiation section for irradiating the optical disk 200 with the deflected laser beam, and a detection section for reading a reflected light beam from the optical disk 200.

The moving stage 144 is capable of mounting the optical pickup 140 and moving in the radial direction of the optical disk 200 along the second guide shaft 148.

Hereinafter, the configuration of the optical disk 200 will now be explained with reference to FIG. 4.

Figure 4:
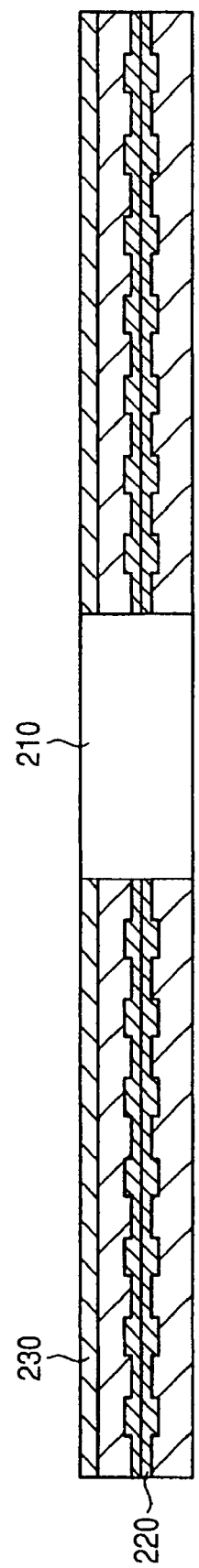
FIG. 4 is an explanatory diagram schematically showing a cross-sectional view of the optical disk along the A-A line shown in FIG. 2.

FIG. 4 is an explanatory diagram schematically showing a cross-sectional view of the optical disk 200 along the A-A line shown in FIG. 2. The optical disk 200 includes a center hole 210, a recording side 220, and a label side 230. It should be noted that as the optical disk 200 there are cited, for example, CD-R/RW, recordable DVD (e.g., DVD-R/RW/+R/+RW/RAM), and Blu-ray Disc (BD-R/BD-RE).

The center hole 210 is a circular hole for fitting the optical disk 200 to the spindle motor 134 and the chucking section 138. The diameter of the center hole 210 can be in a range of about 15 mm through 16 mm.

The recording side 220 includes a data signal recording area for recording various kinds of information and a reference signal recording area used for detecting the rotational angle of the optical disk 200. In the DVD-R, for example, the data signal recording area can be formed of a spiral land/groove structure, the detail of which will be explained later together with the reference signal recording area with reference to FIGS. 7A and 7B.

The label side 230 functions as an ink receiving layer (a visible information printing layer) for inkjet printing, on which the label information such as characters, signs, and pictures can be printed. The printable range of the label side 230 can be an area on the optical disk 200 with the radius of 20 mm through 57 mm, namely the width of 37 mm. It should be noted that the label side 230 can be realized by additionally adhering a printing sheet on the entire surface of the optical disk 200.

Hereinafter, a flow of control of the printing section and the data processing section in the optical disk drive according to the present embodiment will now be explained.

Figure 5:
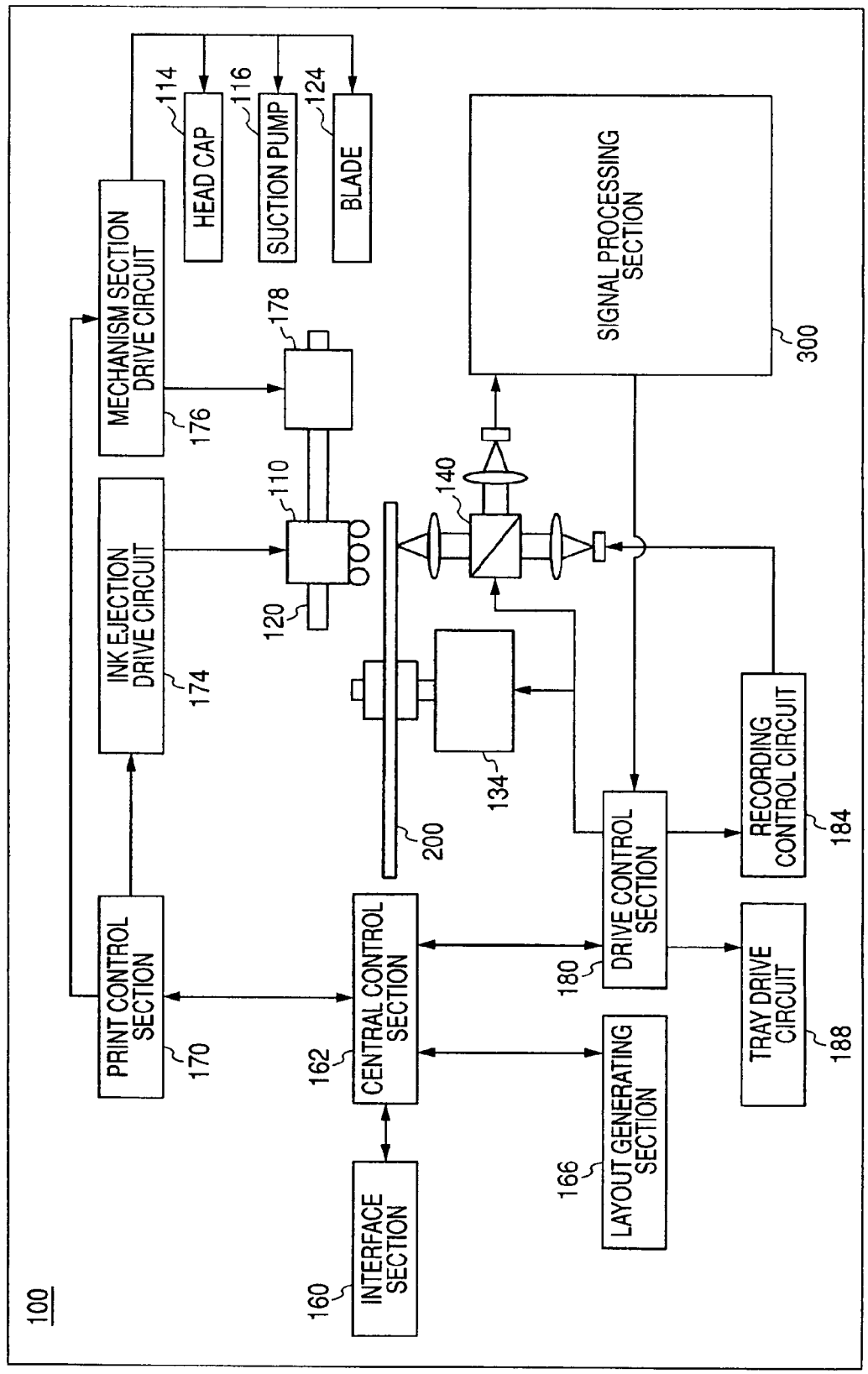
FIG. 5 is a block diagram showing a signal flow in the optical disk drive according to the present embodiment.

FIG. 5 is a block diagram showing a signal flow in the optical disk drive 100 according to the present embodiment. The optical disk drive 100 includes an interface section 160, a central control section 162, a layout generating section 166, a print control section 170, an ink ejection drive circuit 174, a mechanism section drive circuit 176, a head drive motor 178, a drive control section 180, a recording control circuit 184, a tray drive circuit 188, and a signal processing section 300.

The interface section 160 is a connecting section where the optical disk drive 100 and an external device communicate signals with each other. In response to inputting the data signal to be recorded on the optical disk 200 or the label information to be printed on the label side from the outside, the interface section 160 outputs them to the central control section 162. Further, it also outputs the data signal reproduced by the optical disk drive 100 from the optical disk 200 to the external device. As the external device, there are cited a DVD recorder, a PC, and so on for communicating the data signal and the label information.

Further, in the case in which the print data is recorded on an external storage device as described later, the interface section 160 also functions as the data processing section for retrieving the print data.

The central control section 162 performs overall control of the optical disk drive 100. Specifically, it outputs the label information input from the interface section 160 to the print control section 170 after executing the polar coordinate transformation thereon if necessary, outputs the data signal to the drive control section 180, and controls the print control section 170 and the drive control section 180. Further, the reference information input from the drive control section 180 to the print control section 170.

Figure 6C:
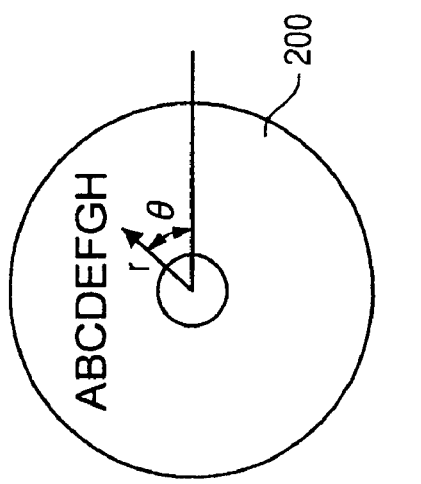
FIGS. 6A through 6C are explanatory diagrams showing a process of a polar coordinate transformation.
Figure 6B:
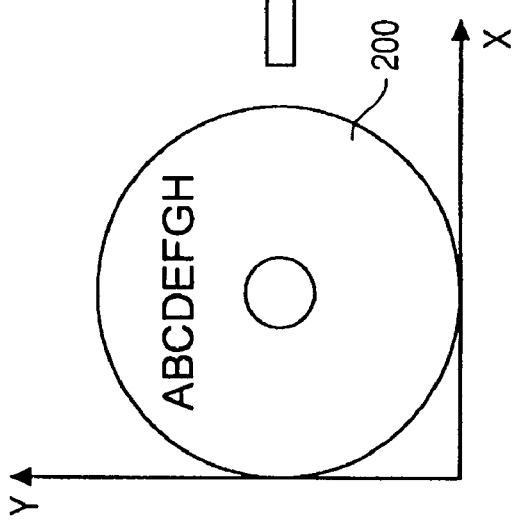
Figure 6A:
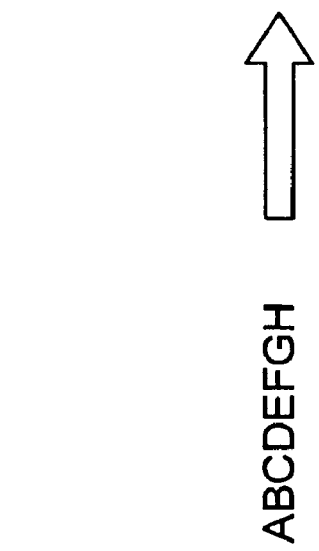

FIGS. 6A through 6C are explanatory diagrams showing a process of the polar coordinate transformation. Firstly, as shown in FIG. 6A, it is assumed that the label information composed of a character string of "ABCDEFGH" is input to the central control section 162 via the interface section 160. Then, as shown in FIG. 6B, an image of the character string "ABCDEFGH" is developed on the memory (not shown) assuming the character string as the data in the X-Y coordinate system. Then, as shown in FIG. 6C, the central control section 162 calculates the radius (r) with respect to the rotational center of the optical disk 200 for every pixel forming the image developed on the X-Y coordinate system, and calculates the angle (θ) with respect to the origin of the rotational angle, thus the label information can be transformed into the polar coordinate system. Such label information transformed into the polar coordinate system is temporarily held in the central control section 162. It should be noted that the origin of the rotational angle described above can be detected by the reference signal described below.

According to the above configuration, the label information composed of a character string and an image can be printed on the optical disk 200 without causing a problem that the label information is printed in a circular arc shape or with distortion.

The layout generating section 166 functions as a print configuring section, and generates the layout of the label information to be printed in accordance with the print data retrieved from the optical disk 200, which is composed of the label information already printed on the label side of the optical disk 200 and/or the label information to be printed associated with each other. The details of the layout generating section 166 will be described later with reference to FIGS. 15 and 16.

The print control section 170 outputs signals for controlling printing of the label information to the ink ejection drive circuit 174 and the mechanism section drive circuit 176 in accordance with the input of the label information and the reference information from the central control section 162.

The ink ejection drive circuit 174 drives the print head 110 to eject ink on the mounted optical disk 200. For example, the ink ejection drive circuit 174 is a pair of electrodes provided to the print head 110, between which the potential difference is generated in accordance with the signal input from the print control section 170. Accordingly, the pair of electrodes is deformed to pressurize an ink tank (not shown) of the print head 110, thus ejecting the ink. It should be noted that the ink is illustrated as droplets on the nozzle surface of the print head 110 in the illustrated example. As an alternative, the ink ejection drive circuit 174 can be configured using a method applying thermal expansion of the ink.

The mechanism section drive circuit 176 drives the head cap 114, the suction pump 116, the blade 124, and the head drive motor 178. The head drive motor 178 can be a motor for rotating the first shaft 120 to move the print head 110 in the radial direction of the optical disk 200.

Here, a partial recording method, a multipass recording method, and an optical density correction method of the label information performed under control of the print control section 170 will briefly be explained.

The partial recording method denotes a method of printing while shifting the ink ejection phase every rotation of the optical disk 200. For example, it is assumed that the ink ejection phase is shifted by a quarter period for every rotation of the optical disk 200 and the optical disk 200 is rotated four revolutions at the same radius distance. Then, the intervals (dot pitch) between the ejected ink droplets become the same as the intervals in the case of printing with a frequency four times as high as the present frequency, thus achieving printing of the label information with high precision.

The multipass recording method denotes a method of printing while shifting the print head 110 in the radial direction of the optical disk 200 as well as shifting the ink ejection phase every rotation of the optical disk 200 as described in the above partial recording method. For example, it is assumed that the 320 nozzles are disposed in substantially the radial direction of the optical disk 200 with the intervals of 0.0423 mm, and that the printable range for the label information is the area on the optical disk 200 with the radius of 20 mm through 57 mm, namely the width of 37 mm.

Then, printing is performed while shifting the ink ejection phase by a quarter period, and at the same time, shifting the radial position of the print head 110 on the optical disk 200 by a quarter (3.384 mm) of the head size for every rotation of the optical disk 200, thus the printing is completed when the optical disk 200 rotates totally 14 revolutions. According to the multipass recording method, the variation in ink ejection amount among the nozzles can be canceled, thus achieving improvement of the printing quality.

The optical density correction method denotes a method of equalizing the dot pitch of the ink throughout the printing area of the optical disk 200. If printing is performed with constant angular velocity of the optical disk 200 and the ink ejection frequency, the dot pitch becomes proportional to the radial distance of the printing position, and accordingly, varies between the inner and outer circumferences. For example, assuming that the printable range for the label information is the area with the radius of the optical disk 200 of 20 mm through 57 mm, namely the width of 37 mm and the ink ejection frequency is 8.4 kHz, the dot pitch in the outermost circumference with the radius of 57 mm is 0.0423 mm while the dot pitch in the innermost circumference with the radius of 20 mm is 0.0148 mm.

That is, the dot pitch in the innermost circumference becomes a third of that in the outermost circumference, and accordingly, the amount of the recorded ink per unit area triples resulting in a high optical density. The optical density correction method is a method for correcting such a problem by previously correcting the label information to be printed. In further detail, it is achieved by thinning out the label information in the inner circumference of the optical disk 200 when transforming the label information input from the external device into the polar coordinate system. In the example described above, by previously processing the label information so that the number of times of ink ejection in the innermost circumference becomes a third of that in the outermost circumference, the variation in the optical density between the inner and outer circumferences can be eliminated.

It should be noted that the optical density can also be equalized to some extent by controlling the rotational speed of the optical disk 200 in the inner and outer circumferences of the optical disk 200. However, since the print head 110 has a predetermined width, the dot pitch varies in accordance with the radial distance in the optical disk 200 of each of the nozzles included in the print head 110, thus causing the variation in the optical density.

The drive control section 180 controls rotation of the spindle motor 134 and the optical pickup drive motor (not shown) Further, it also controls reproducing and recording of the data signal by the optical pickup 140. It should be noted that the data signal includes not only video data and audio data but also print data described later, and the optical pickup 140 functions as the data processing section and/or the data reproducing section.

The recording control circuit 184 performs an encoding process and modulation of the data signal. Further, under control of the drive control section 180, it controls light intensity modulation of the laser light source necessary for reproducing and recording the data signal in the optical pickup 140. The tray drive circuit 188 drives the tray 130 for mounting the optical disk 200.

The spindle motor 134 rotates the optical disk 200, and the optical pickup drive motor moves the radial position of the optical pickup 140. Hereinafter, the rotational speed (drive speed) of the optical disk 200 by the spindle motor 134 will be explained.

The optical disk 200 usually rotates at a thousand rpm through several thousands rpm when recording/reproducing the data signal. If the rotational speed is 3000 rpm, the circumferential velocity at the outermost circumference of the optical disk with a diameter of 120 mm becomes 19 m/s. Further, the flight speed in the ink ejection is typically in a range of about 5 through 20 m/s. Here, the circumferential velocity denotes the velocity of any one point on the optical disk 200 moving in the circumferential direction of the optical disk 200, and the flight speed denotes the average speed of the ink ejected from the nozzle moving from the nozzle to the point 1 mm distant from the nozzle.

Therefore, in consideration of nonuniformity in the landing position of the ink caused by the air flow generated by the rotation of the optical disk 200 and the variation of the flight speed among a number of nozzles, the rotational velocity of the optical disk 200 in the label information printing can be set to 2 m/s or lower in circumferential velocity or 320 rpm or lower. Even in consideration of the effect of the centrifugal force acting on the ink after the ink has landed on the optical disk 200, it is advantageous to set the circumferential velocity or the rotational speed of the optical disk 200 to the above amounts.

As another example, the case in which the flight speed of the ink varies by nozzle in a range of ±1 m/s around the center value of 10 m/s and the distance between the print head 110 and the optical disk 200 is 1 mm is assumed. In this case, since the ink flight time becomes 111 µs at a maximum and 91 µs at a minimum, the difference of 20 µs at a maximum is caused in the ink flight time. Therefore, if the ink is ejected on the circumference with the circumferential velocity of 19 m/s, the error in the landing position becomes 384 µm at a maximum, and if the ink is ejected on the circumference with the circumferential velocity of 2 m/s, the error in the landing position becomes 40 µm at a maximum. Although the error in the latter case is in a range hardly visible to the naked eye, the error in the former case is nine times as large as the latter, and in a range visible to the naked eye.

As described above, since too high circumferential velocity of the optical disk 200 causes the error in the ink landing position to become large, the data signal recording and the label information printing are performed at separate rotational speeds in the present embodiment, and for example, the rotational speed of the optical disk 200 in the printing mode can be 238 rpm (about 1.4 m/s in the circumferential velocity at the outermost circumference).

It should be noted that although the example of rotating the optical disk 200 itself as the recording medium by the spindle motor 134 is explained in the optical disk drive 100 described above, it is also possible to arrange the printing section (the print head 110) and the data processing section (the optical pickup 140) to be moved by a driver. Further, since the recording medium is not limited to the optical disk 200, the motion by the driver is not limited to the circular motion, but can be linear motion, for example.

Therefore, in the case in which the recording medium, the printing section, and the data processing section are arranged to be moved by the driver, the drive speed of the driver denotes the difference in speed between the recording medium and the printing section in the printing mode, or the difference in speed between the recording medium and the data processing section in the recording or reproducing mode.

Further, as described in the present embodiment, in the case in which the recording medium itself is driven, the driver which performs driving to the recording medium denotes a driver for driving the recording medium. The rotational speed or the traveling speed of the recording medium corresponds to the driving speed.

The signal processing section 300 inputs the reproduced light from the optical disk 200 received by a photo acceptance element of the optical pickup 140 as a reproduced signal from the optical disk 200, and processes it into the data signal. Specifically, it performs processes such as demodulation, error detection, and error correction of a radio frequency (RF) signal input from the optical pickup 140, and performs reproduction of the data signal and generation of a tracking signal.

Further, the signal processing section 300 detects the reference signal representing the rotational angle of the optical disk 200 and outputs it to the drive control section 180.

Hereinafter, details of the reference signal and the signal processing section 300 for detecting the reference signal will now be explained.

In general, the rotational angle of a driving section driven by a motor is detected by a rotary encoder or a tachometer generator attached to the motor. However, in the optical disk drive 100, it is quite difficult to detect the absolute rotational angle of the optical disk 200 using the rotary encoder or the tachometer generator described above because the relative angle of the optical disk 200 seen from the spindle motor 134 varies every time the optical disk 200 is inserted and ejected.

It is important especially in the following points to detect the absolute rotational angle of the optical disk 200 when printing the label information. Firstly, since the rotation of the spindle motor 134 and the rotation of the optical disk 200 do not necessarily correspond to each other, and detection accuracy of the rotational angle is low, if the label information is printed based only on the rotational angle of the spindle motor 134, the print quality cannot be assured. Secondly, in the case in which it is attempted to print the new label information additionally utilizing the non-printed area of the optical disk on which the label information has already printed once, the optical disk drive 100 problematically fails to recognize where on the optical disk 200 is the non-printed area, and accordingly, does not appropriately add the new label information.

According to an embodiment of the invention, there is provided the optical disk drive 100 capable of detecting the absolute rotational angle of the optical disk 200 based on the reference signal previously recorded on the optical disk 200.

Figure 7A:
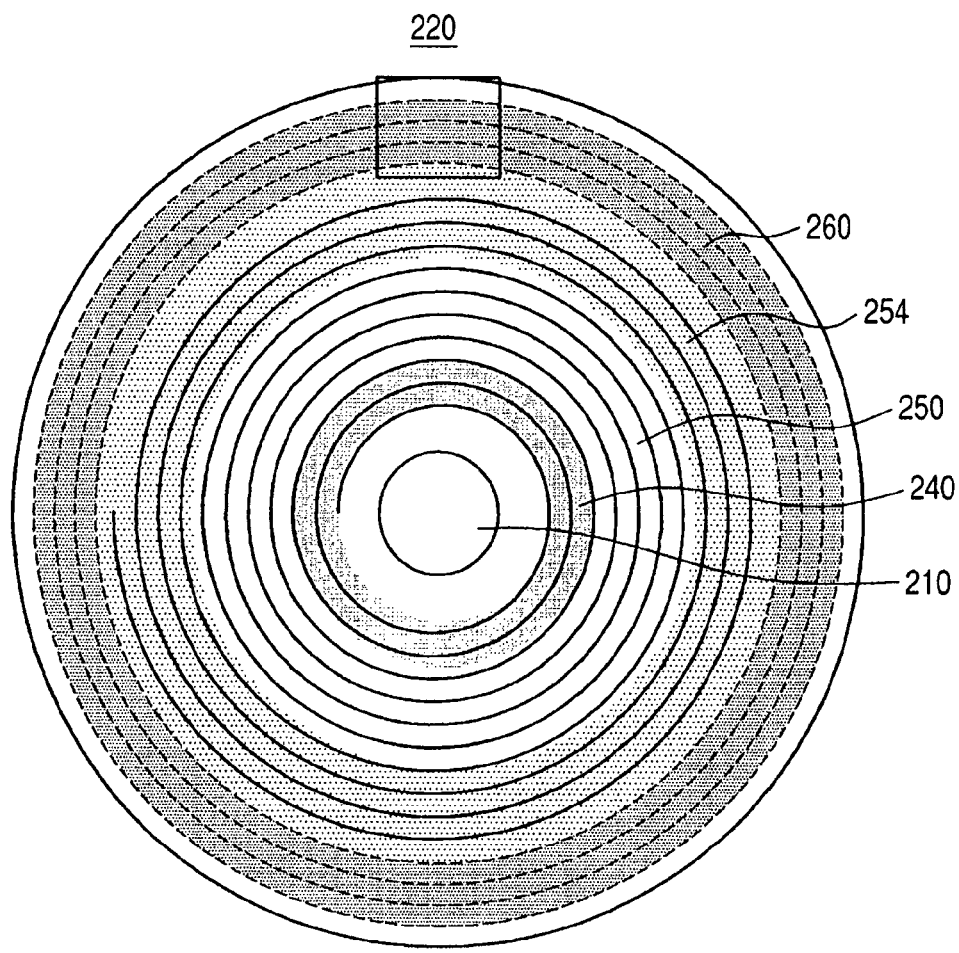
FIGS. 7A and 7B are explanatory diagrams showing the configuration of a recording side of the optical disk.
Figure 7B:
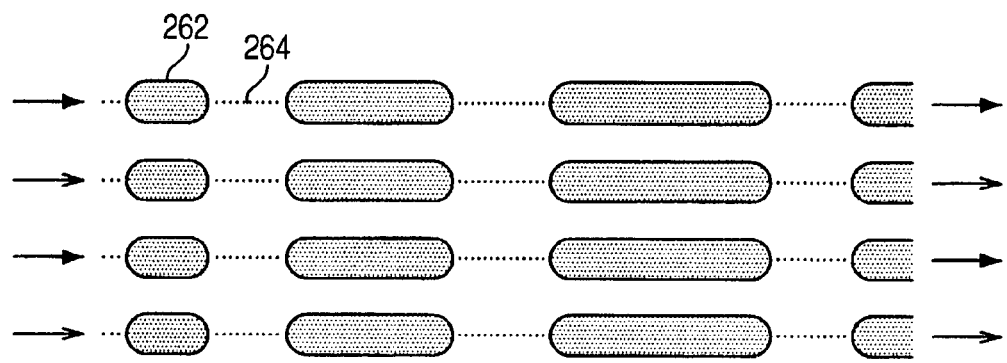

FIGS. 7A and 7B are explanatory diagrams showing the configuration of the recording side 220 of the optical disk 200. FIG. 7A is the explanatory diagrams schematically showing the recording side 220 of the optical disk 200. The recording side 220 of the optical disk 200 includes the center hole 210, a lead-in area 240, a data area 250, a lead-out area 254, and a reference signal recording area 260.

The lead-in area 240 positions inside the data area 250, and points a start point of the data area 250. The lead-out area 254 positions outside the data area 250, and points an end point of the data area 250. The data area 250 positioned between the lead-in area 240 and the lead-out area 254, and is capable of recording the data signal. These three areas are composed of, for example, a spiral land/groove structure, and disk information, sector information, and a clock signal are recorded using a wobble signal by the groove and a pre-pit signal by the land.

The reference signal recording area 260 is disposed outside the lead-out area 254, and is capable of recording the reference signal representing the rotational angle of the optical disk 200.

FIG. 7B is the explanatory diagram enlargedly showing a part of the reference signal recording area 260. In the illustrated example, there is shown the condition in which the reference signal is recorded by the pit signal.

The reference signal recording area 260 can concentrically record a number of reference signals with the pits 262 and the lands 264. It should be noted that the configuration of recording the reference signal with the wobble signal and the pre-pit signal of the land in the land/groove structure, or the configuration of spirally recording the reference signal can be adopted. Further, the reference signal recording area 260 can be included in the data area 250.

Figure 8:
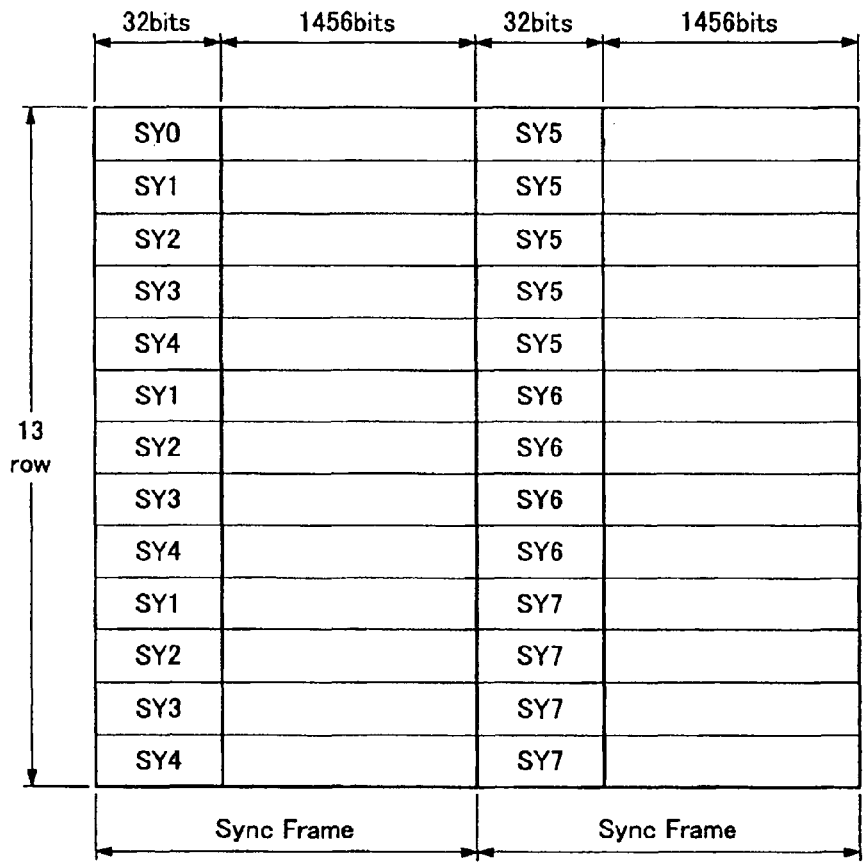
FIG. 8 is an explanatory diagram showing the standard for the physical sector of the DVD-ROM as one of the optical recording mediums.

FIG. 8 is an explanatory diagram showing the standard for the physical sector of the DVD-ROM as one of the optical recording mediums. Each sync frame includes 1488 channel bits with the sync signal (SY0 through SY7) composed of 32 channel bits in the lead. Each physical sector includes 2 columns and 13 rows of sync frames, and is composed of 38688 channel bits, which corresponds to the recording length of the pits of about 5.10 through 5.21 mm.

Therefore, as shown in FIGS. 7A and 7B, by providing the reference signal recording area 260 on the outermost periphery section of the recording side 220 of the optical disk 200, namely on the circumference with a radius of 58.5 mm, as an example, 71 physical sectors can be disposed on the same circumference.

Figure 9:
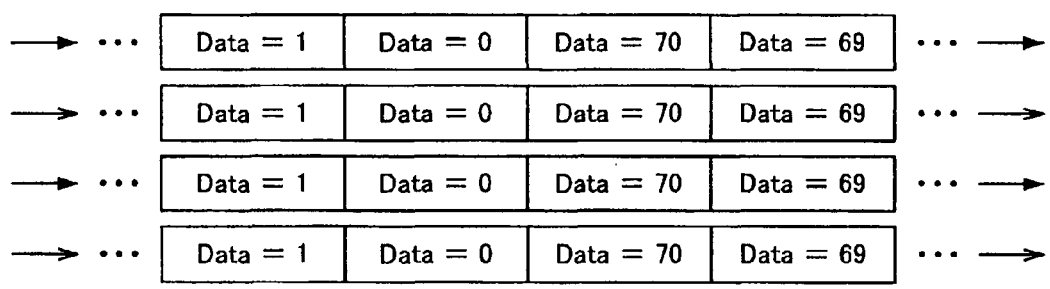
FIG. 9 is an explanatory diagram showing the physical sector and its data in the reference signal recording area.

FIG. 9 is an explanatory diagram showing the physical sectors and data thereof in the reference signal recording area 260. Each rectangular area corresponds to one physical sector, and the numerals shown inside the physical sectors denote the values of the data provided to the physical sectors.

As described above, if the 71 physical sectors are disposed on the same circumference, in order for identifying each of the physical sectors, data of 0 through data of 70 can be provided to the respective physical sectors so that the data values decrease in the order in which the physical sectors are reproduced. According to such a configuration, by defining the time point when reproduction of the physical sector with data of 0 is completed as the reference position of the optical disk 200, the absolute rotational angle of the optical disk 200 can be detected. It should be noted that the error correction data, which is usually included in the content of the data of each of the physical sector, is omitted here.

Further, as shown in FIGS. 7A and 7B, by concentrically providing a plurality of reference signals, even if one of the reference signals is in an unreproducible condition due to a scratch or dirt, the reference position and the absolute rotational angle of the optical disk 200 can be detected based on another reference signal. Further, the probability that the optical pickup 140 can be moved to the reference signal area with a single rough transport action in the radial direction setting the reference signal area as the target position can be increased.

Hereinafter, the signal processing section 300 for processing such a reference signal will be explained.

Figure 10:
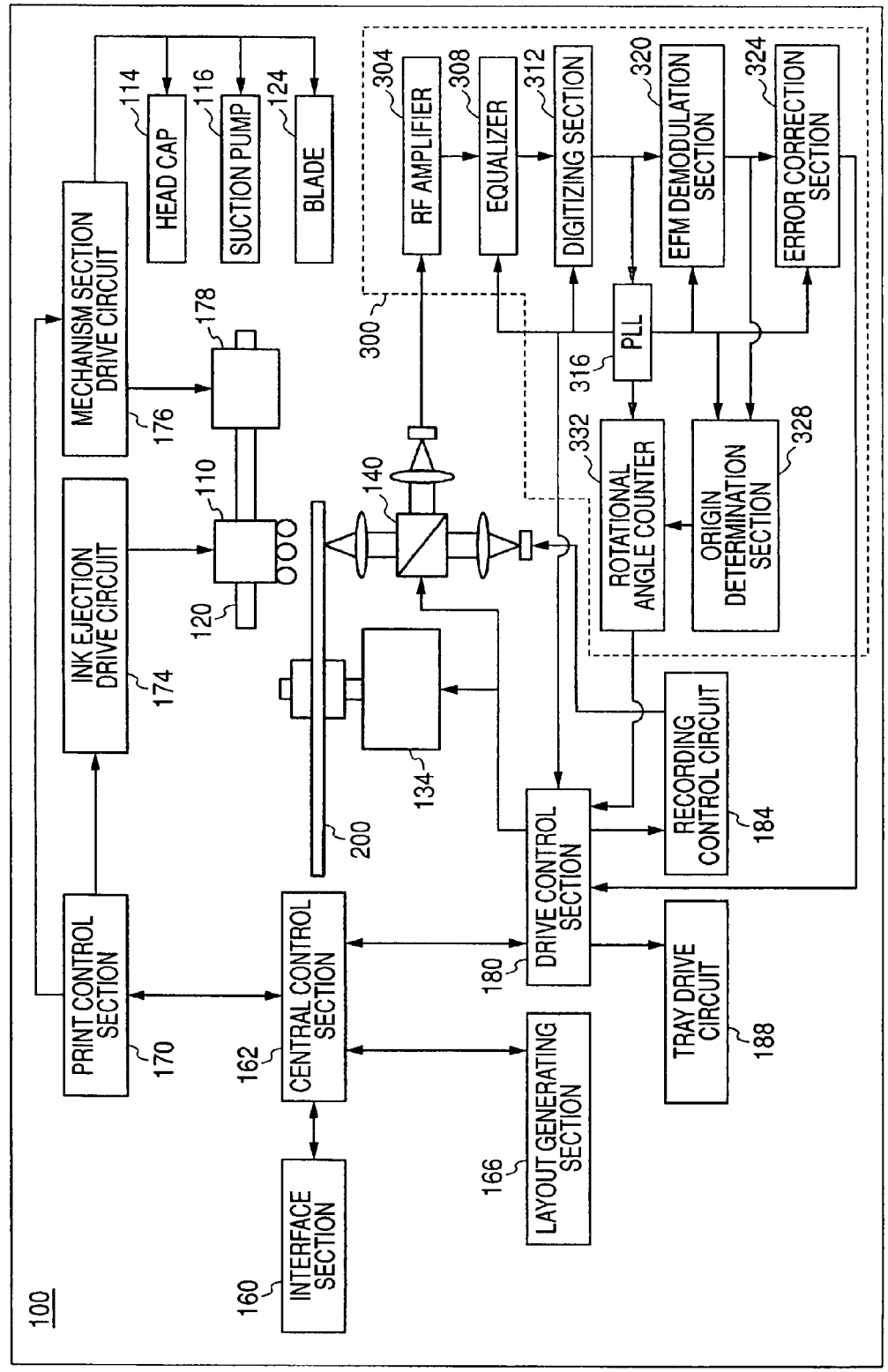
FIG. 10 is a block diagram showing the detailed structure of the signal processing section of the optical disk drive according to the present embodiment.

FIG. 10 is a block diagram showing the detailed structure of the signal processing section 300 of the optical disk drive 100 according to the present embodiment. The signal processing section 300 includes an RF amplifier 304, an equalizer 308, a digitizing section 312, a PLL 316, an EFM demodulation section 320, an error correction section 324, an origin determination section 328, and a rotational angle counter 332.

The RF amplifier 304 amplifies a radio frequency signal input from the optical pickup 140 and outputs it to the equalizer 308. In more detail, the optical pickup 140 reads out the reference signal as the degree of the current strength, and the RF amplifier 304 amplifies the degree of the current strength by current-voltage conversion to output the radio frequency signal.

The equalizer 308 emphasizes the high frequency component of the radio frequency signal input from the RF amplifier 304, which is deteriorated by the signal read-out characteristic of the optical pickup 140.

The digitalizing section 312 quantizes the radio frequency signal input from the equalizer 308 into either "1" or "0." As the digitizing section 312, a comparator can be used.

The PLL 316 generates reproduction clock from the radio frequency signal input from the digitalizing section 312. Further, the reproduction clock thus generated is output to a motor drive circuit 192, the RF amplifier 304, the equalizer 308, the digitizing section 312, the EFM demodulation section 320, the error correction section 324, the origin determination section 328, and the rotational angle counter 332.

The EFM demodulation section 320 demodulates the radio frequency signal modulated with the eight-to-fourteen modulation (EFM) input from the digitizing section 312, and output it as the reproduced signal to the error correction section 324.

The error correction section 324 detects an error in the reproduced signal input from the EFM demodulation section 320, and outputs it after correcting the error, if any.

The origin determination section 328 judges the position where the reproduction of the physical sector of the optical disk 200 with the data of 0 as the original position, and outputs an origin detection signal to the rotational angle counter 328. It should be noted that the determination method of the original position is not limited to the above, but it is also possible to define the position where the blank area, which is provided previously to a part of the reference signal recording area 260, is detected as the original position.

The rotational angle counter 332 counts the reproduction clock input from the PLL 316, and resets the count value in response to input of the origin detection signal from the origin determination section 328. Since in the DVD-R format, the reproduction clock is a piece of information generated every distance of about 133 nm on the circumference of the disk, the rotational angle of the optical disk 200 can be detected by the rotational angle counter 332 by an amount of the angle corresponding to the distance of about 133 nm on the circumference. Therefore, the rotational angle counter 332 can detect a position on the reference signal recording area 260 with a resolution of 191,000 dpi.

Further, since the RF amplifier 304, the equalizer 308, the digitizing section 312, the PLL 316, the EFM demodulation section 320, and the error correction section 324 described above are configuration elements included in the signal processing section 300 in the related art, the detection of the rotational angle of the optical disk 200 can be realized by adding the origin determination section 328 and the rotational angle counter 332 to the circuit.

It should be noted that it is possible to arrange that the rotational angle is detected based on address information contained in each of the physical sectors on the data area without providing the reference signal recording area on the optical disk 200 as shown in FIG. 7A. According to the above configuration, the absolute rotational angle of the optical disk 200 can be detected without executing any particular processes on the optical disk 200.

Hereinafter, print data to be recorded on the recording side 220 of the optical disk 200 and the layout generating section 166 will now be explained.

The layout generating section 166 forming a part of the optical disk drive 100 according to the present embodiment generates the layout of the label information such as a printing position or a printing format with reference to the print data relating to the printing status of the optical disk 200 when printing the label information. In more detail, the printing state of the label side of the optical disk 200 is recorded in the optical disk 200 as image data, and when additionally printing the label information thereon, the layout generating section 166 develops the image data on the memory to judge the non-printed area, and determines the layout of the label information within the range of the non-printed area. Hereinafter, the recording area of the print data is firstly described with reference to the drawings.

Figure 11:
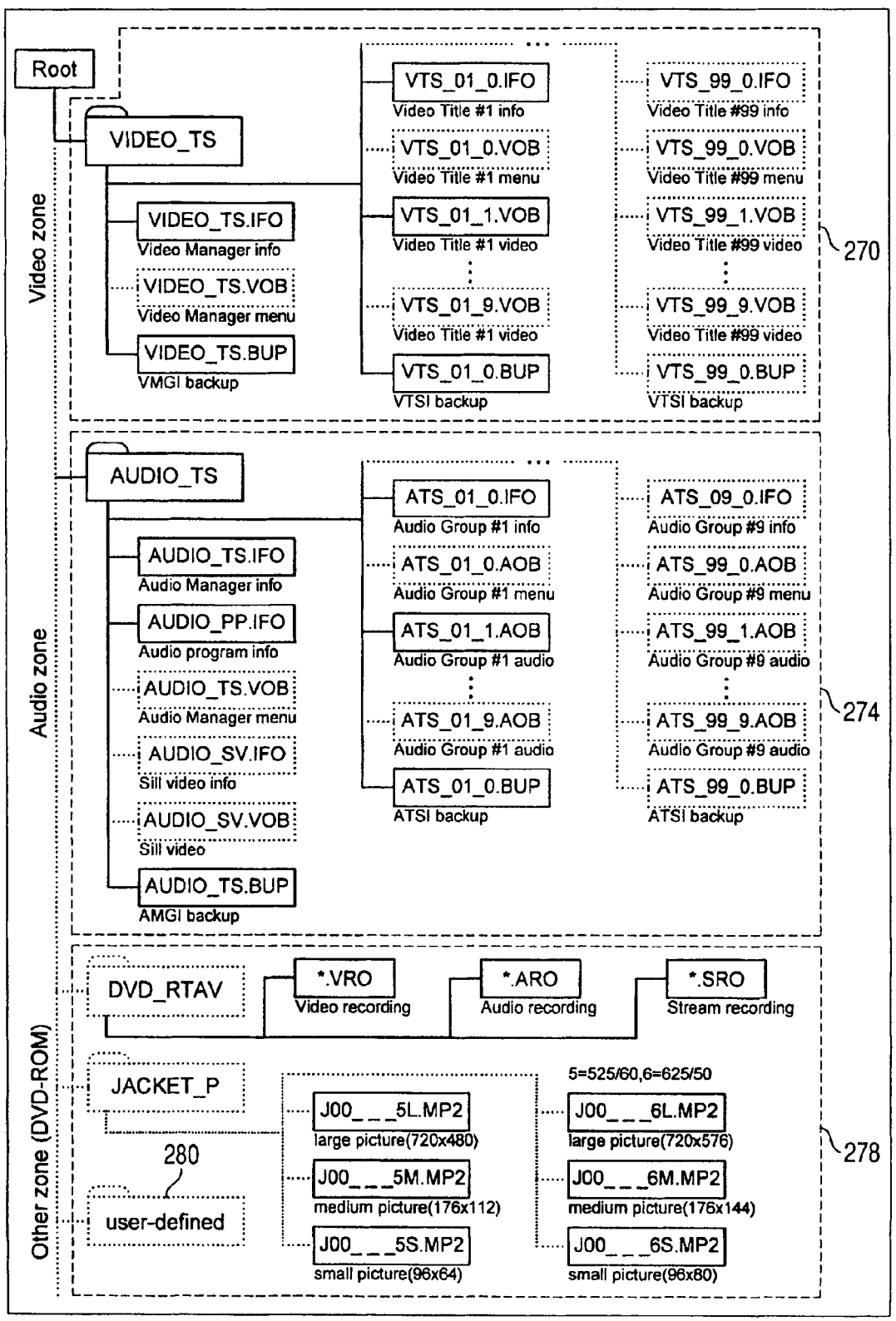
FIG. 11 is a diagram showing a file configuration of the DVD video standard in the DVD-ROM.
Figure 12:
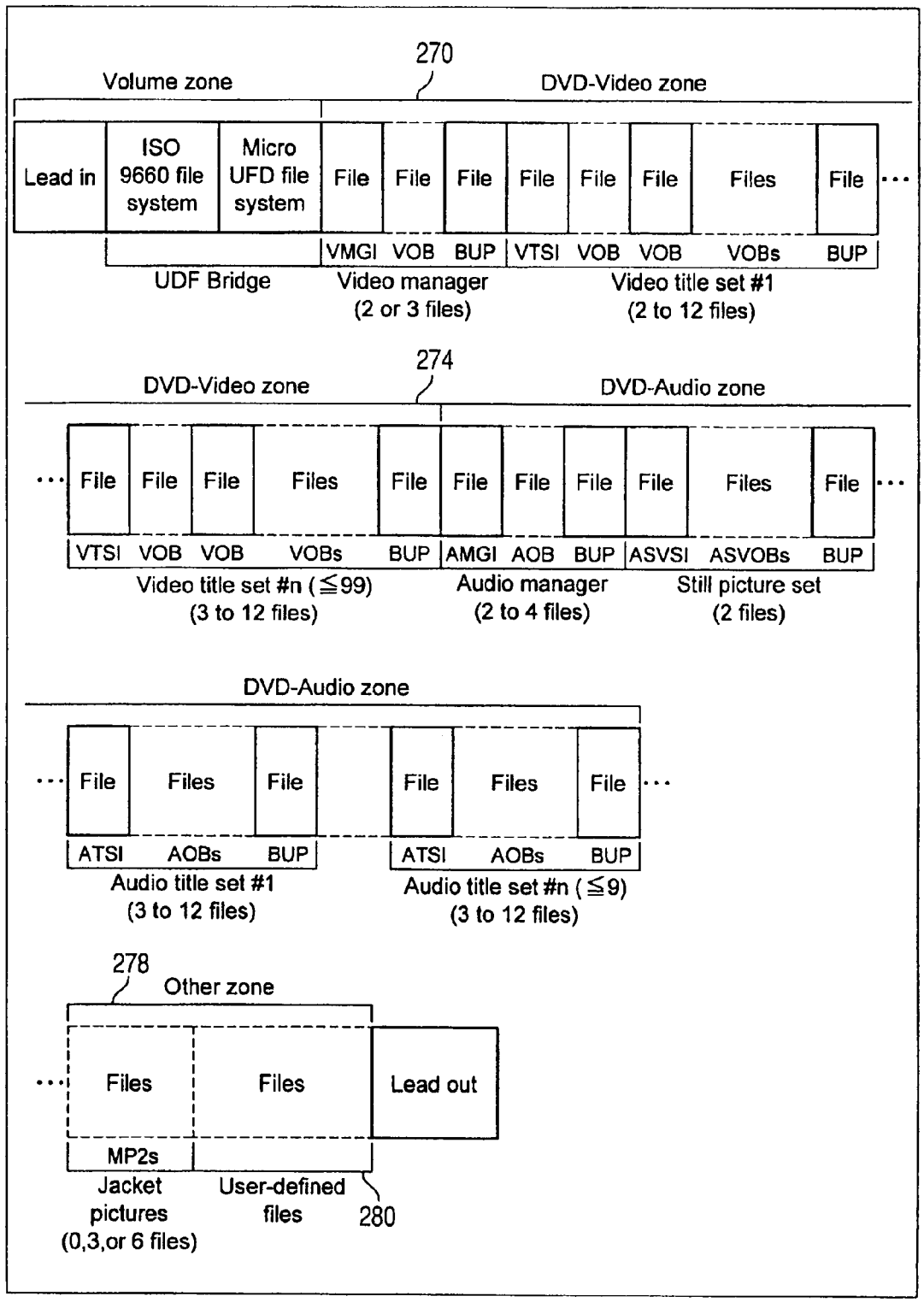
FIG. 12 is a diagram showing a data layout of the DVD video standard in the DVD-ROM.

FIG. 11 shows a file configuration of the DVD video standard in the DVD-ROM. FIG. 12 shows a data layout of the DVD video standard in the DVD-ROM.

Referring to FIGS. 11 and 12, the data area according to the DVD video standard in the DVD-ROM is large, and includes a video data area 270 for holding the data regarding video pictures, an audio data area 274 for holding the data regarding sound, and an auxiliary data area 278 for holding miscellaneous data.

The auxiliary data area 278 includes an UD file 280 called user-defined files (UDF) which the user is allowed to use freely, and accordingly, it is possible to record the print data in the UD file 280 as an example. It should be noted that optical disks such as DVD-R and DVD-RW can have the similar file structure by the universal disk format.

Figure 13:
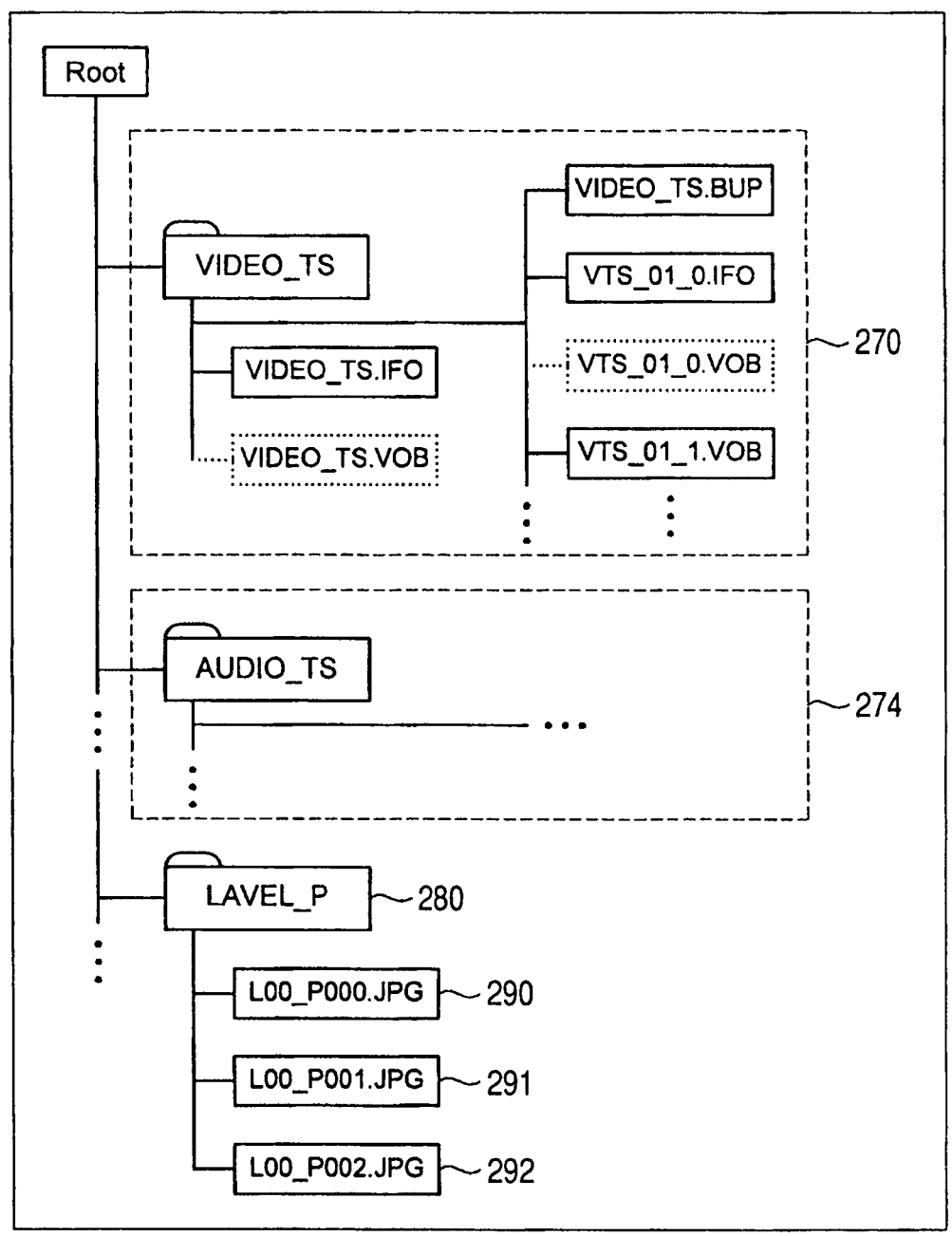
FIG. 13 is an explanatory diagram showing a condition of using the UD file as a print data recording area.

FIG. 13 is an explanatory diagram showing a condition of using the UD file 280 as the print data recording area. It should be noted that the UD file 280 is provided with LABEL_P as a directory name. Further, although as a format with which the print data is recorded in the UD file 280, there can be cited the JPEG format, the PNG format, and the GIF format, the case of recording the print data with the JPEG format is illustrated here.

FIGS. 14A through 14F are explanatory diagrams showing a process of generating a layout performed by the layout generating section 166. FIG. 15 is a flow chart showing a flow of generating the layout by the layout generating section 166. Hereinafter, the layout generating process for the label information performed by the layout generating section 166 will be explained with reference to FIGS. 13, 14A through 14F, and 15.

Figure 14A:
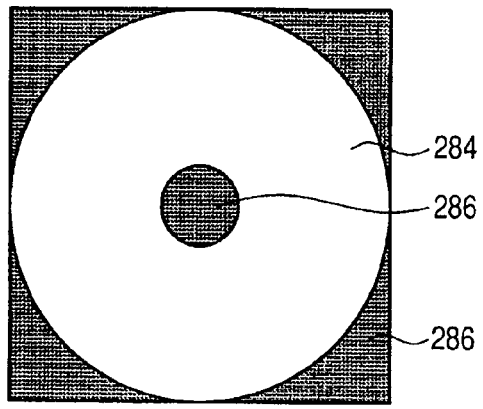
FIGS. 14A through 14F are explanatory diagrams showing a process of generating a layout performed by a layout generating section.
Figure 15:
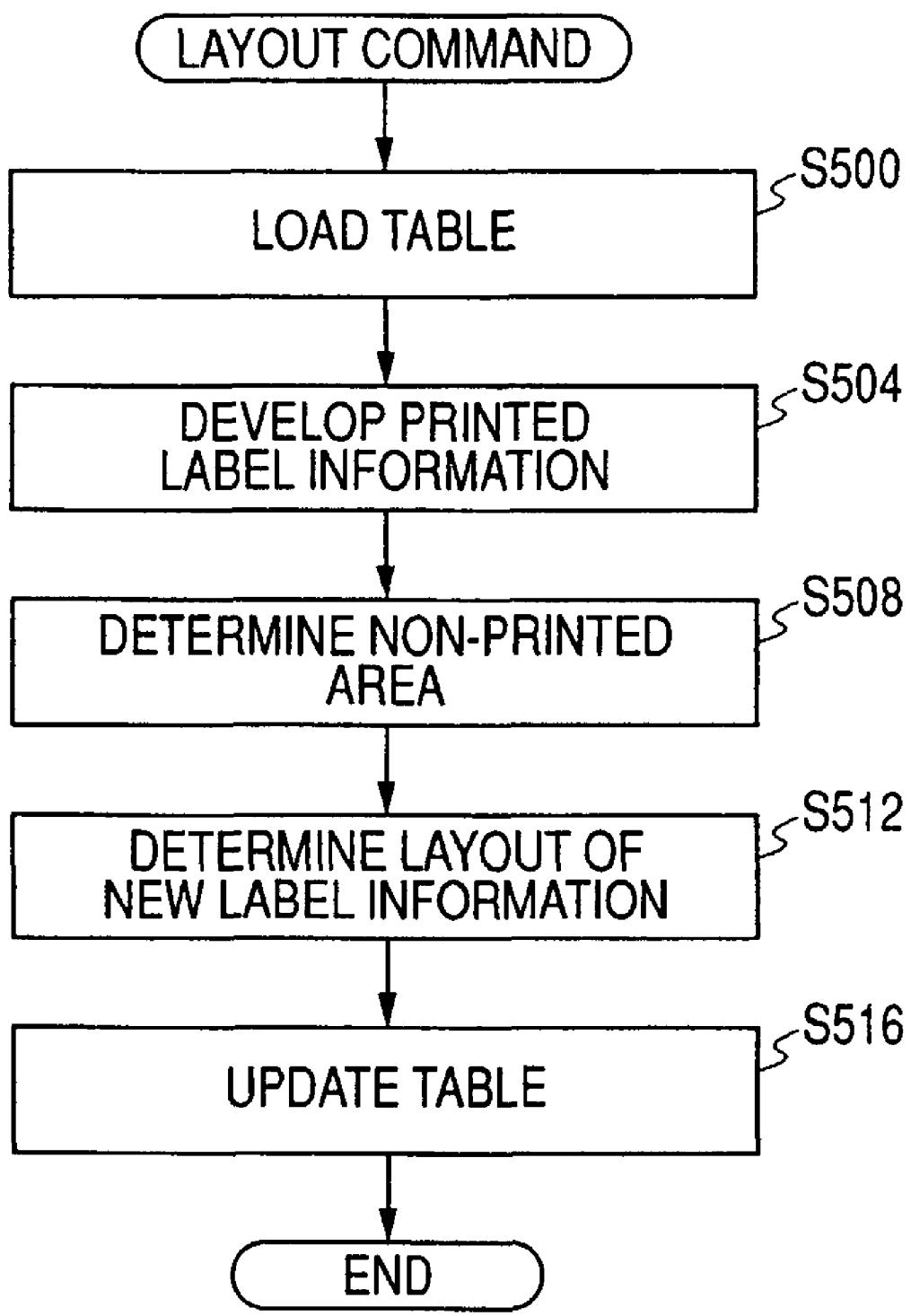
FIG. 15 is a flow chart showing a flow of generating the layout by the layout generating section.

Firstly, "L00_P000.JPEG" shown in FIG. 14A is recorded on the UD file 280 as initial print data 290 in the manufacturing process of the optical disk 200. The initial print data 290 represents a printable area 284 as white data, and a non-printable area 286 as black data.

Figure 14B:
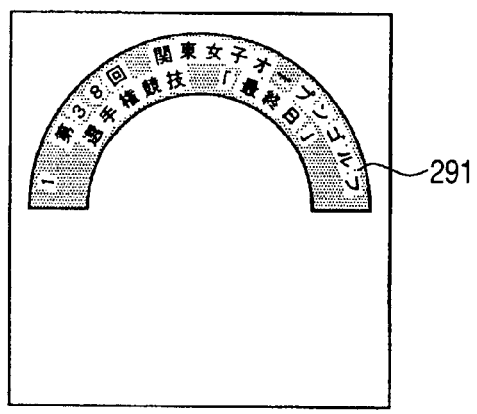
Figure 14C:
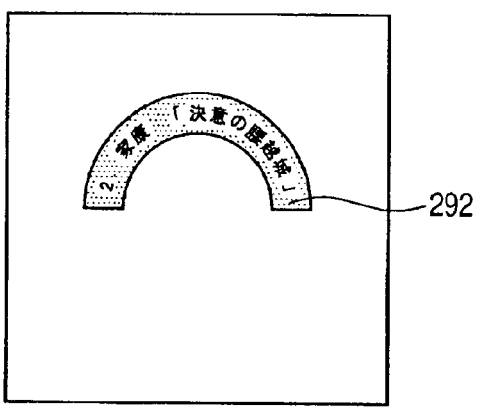

Further, it is assumed that first print data 291 shown in FIG. 14B, which is the label information already printed on the optical disk 200, and second print data 292 shown in FIG. 14C have been recorded on the UD file 280. It should be noted that the first print data 291 is provided with "L00_P001.JPG", and the second print data 292 is provided with "L00_P002.JPG".

Figure 14D:
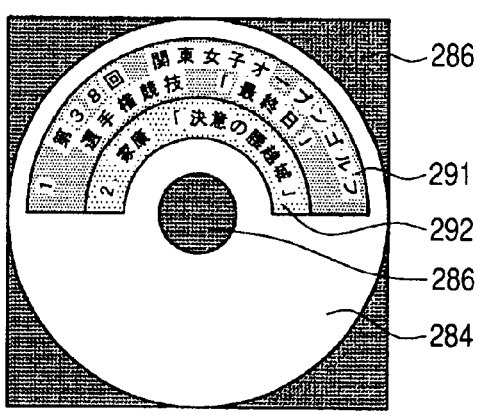
Figure 14E:
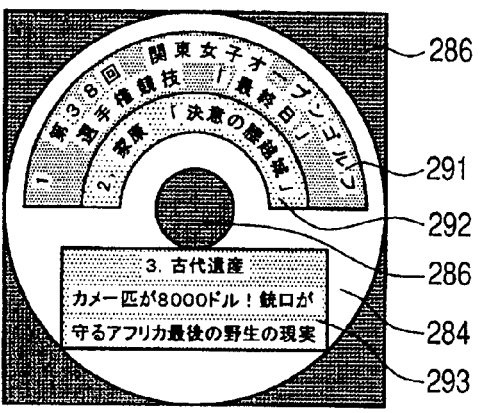
Figure 14F:
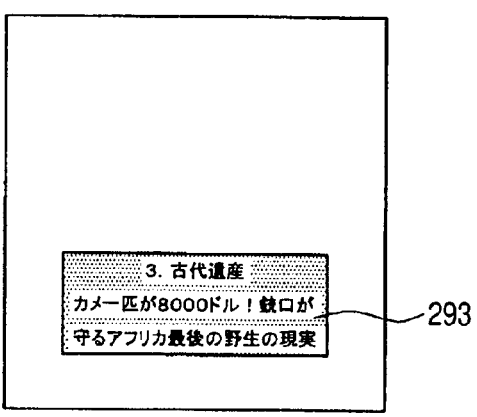

If it is attempted that further label information is printed on the optical disk 200, the layout generating section 166 loads the print data 290 through 292 (table) recorded on the UD file 280 and develops it on the memory as shown in FIG. 14D (S500, S504). Then, it judges the non-printed area represented with white data in the developed image (S508). Subsequently, as shown in FIG. 14E, it determines the printing position of the label information to be additionally printed thereon within the range of the non-printed area (S512).

Finally, when additionally printing the label information, it records the label information on the UD file 280 as third print data 293, and updates the print data, thus terminating the process (S516). It should be noted that the third print data 293 can be provided with "L00_P003.JPG" which is obtained by incrementing the number provided to the existing print data.

Figure 16:
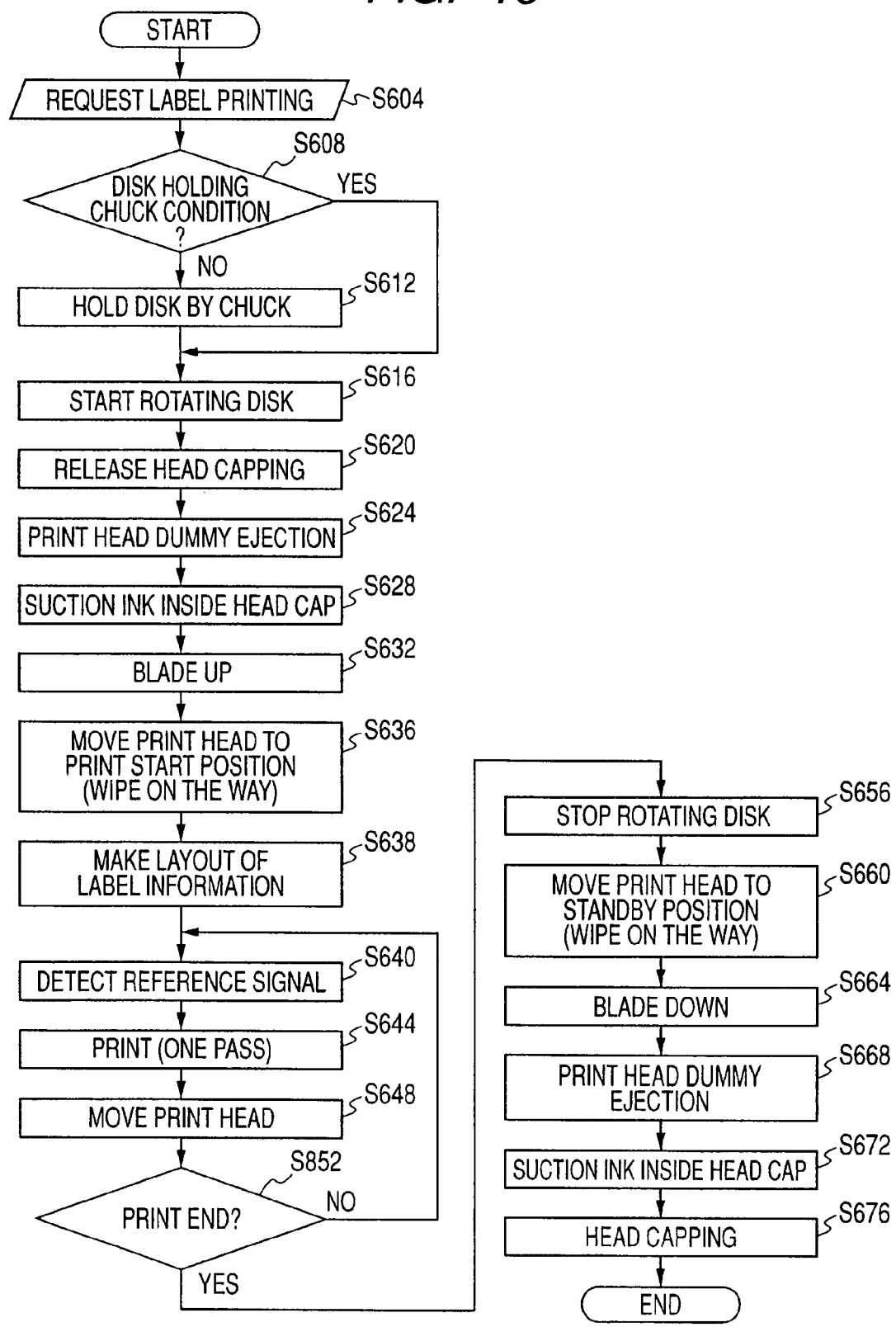
FIG. 16 is a flow chart showing an overall flow of label information printing performed by the optical disk drive.

FIG. 16 is a flow chart showing an overall flow of label information printing performed by the optical disk drive 100 as explained above.

Firstly, when printing of the label information is required to the optical disk drive 100, whether or not the optical disk 200 is held by the chuck is determined (S604, S608). If it is judged that the optical disk 200 is not held by the chuck, the chucking section 138 holds the optical disk 200 (S612).

The spindle motor 134 start rotating the optical disk 200 (S616) if it is judged in the step S608 that the optical disk 200 is held by the chuck, or after the optical disk 200 is held by the chuck in step S612. Then, the inside of the head cap 114 attached to the print head 110 is set to be the atmospheric pressure (S620), and the print head 110 performs the dummy ejection of the ink (S624). Subsequently, the suction pump 116 sucks the ink in the head cap 114 discharged by the dummy ejection by the print head 110 (S628), and then the blade 124 is moved to the position where it can wipe the nozzle surface of the print head 110 (S632).

Then, the print head 110 is moved to the print starting position, and the nozzle surface 150 of the print head 110 is wiped by the blade 124 on the process of the movement (S636). Subsequently, the layout generating section 166 makes the layout of the label information to be printed (see FIG. 15) (S638). Subsequently, when the original position of the optical disk 200 is detected by the optical pickup 140, the print head 110 prints only a part of the label information corresponding to one revolution (S640, S644). Then, the print head 110 is moved towards the inner circumference of the optical disk 200 if necessary (S648). Here, whether or not the printing of the label information is finished is determined (S652), and if it is judged that the printing of the label information has finished, then the rotation of the optical disk 200 is stopped (S656). If it is judged that the printing of the label information has not been finished, then the process returns to the step S640 to continue the printing of the label information.

Then, the print head 110 is moved to the print standby position, and the nozzle surface 150 of the print head 110 is wiped by the blade 124 on the process of the movement (S660). After then, the blade 124 is moved to the standby position (S664), and the print head 110 performs the dummy ejection of the ink (S668). Subsequently, the suction pump 116 sucks the ink in the head cap 114 discharged by the dummy ejection by the print head 110 (S676), and then the head cap 114 is attached to the nozzle surface 150 of the print head 110 (S646).

As explained above, even if the area on which visible information has already been printed exists in the label side of the optical disk 200, the optical disk drive 100 according to the present embodiment can print further visible information additionally in the area where no visible information is printed.

It should be noted that although the example of recording the print data on the recording side of the optical disk 200 is presented above, it is also possible to record the print data on an external storage device (not shown) such as an HDD or a flash memory via the interface section 160 with correspondence to the unique identification number of the optical disk 200. In this case, the layout generating section 166 refers to the print data stored in the external storage device to generate the layout of the label information.

Further, although the example of rotating the optical disk 200 itself as the recording medium by the spindle motor 134 is explained in the optical disk drive 100 described above, it is also possible to have the configuration of fixing the recording medium while moving the printing section and the data processing section. In other wards, it is also possible to print the visible information based on the difference in the drive speed between the recording medium and the printing section, and to load the print data based on the difference in the drive speed between the recording medium and the data processing section.

Further, the timing of updating the print data is not limited to a time period after the label information has printed but can be a time period from when the layout generating section 166 generates the layout of the label information to be newly printed to when the print head 110 prints the new label information.

Second Embodiment

Hereinafter, the optical disk drive 100 according to a second embodiment of the present invention will now be explained.

Figure 17:
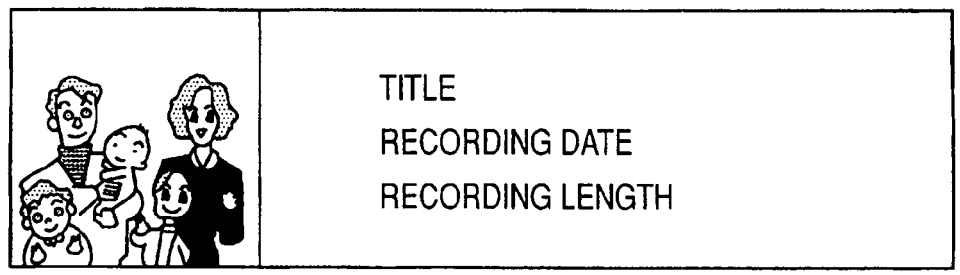
FIG. 17 is an explanatory diagram showing an example of label information to be printed on the optical disk.

FIG. 17 is an explanatory diagram showing an example of label information to be printed on the optical disk 200. In the illustrated example, the label information includes a character strings such as a title, a recording date, and recording length, and image data such as an icon. If the label information including the image data is directly recorded as the print data as in the first embodiment, a large recording capacity has been required in some cases.

According to the second embodiment, there is provided an optical disk drive 100 capable of generating the layout of the label information by the layout generating section 166 while suppressing the volume of the print data. It should be noted that the configuration elements and operations of the optical disk drive 100 except the print data and the layout generating section 166 are substantially the same as the configuration elements and the operations of the optical disk drive 100 explained in the first embodiment, and accordingly the explanations therefor will be omitted.

Figure 18:
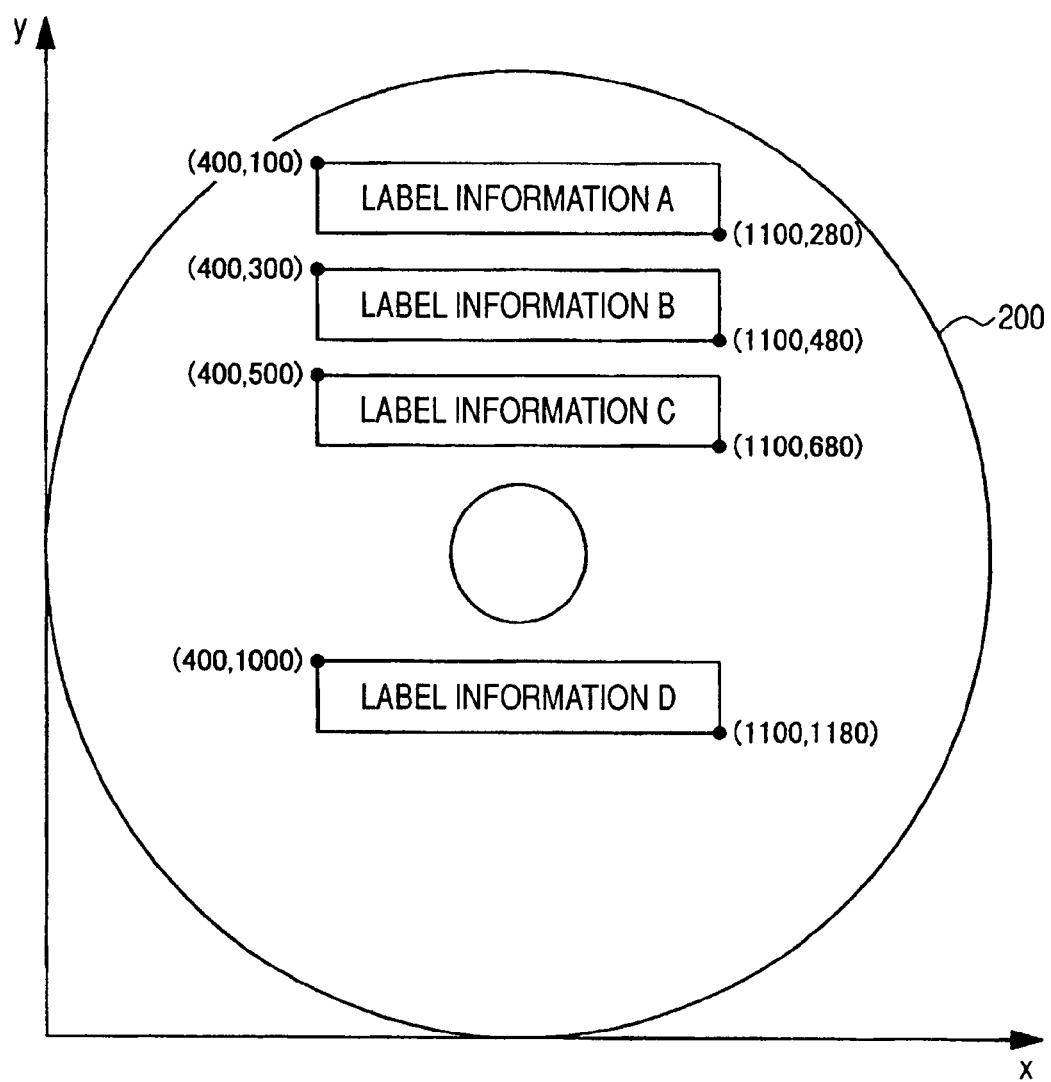
FIG. 18 is an explanatory diagram showing an example of a printing area of the label information.
Figures 19, 20:
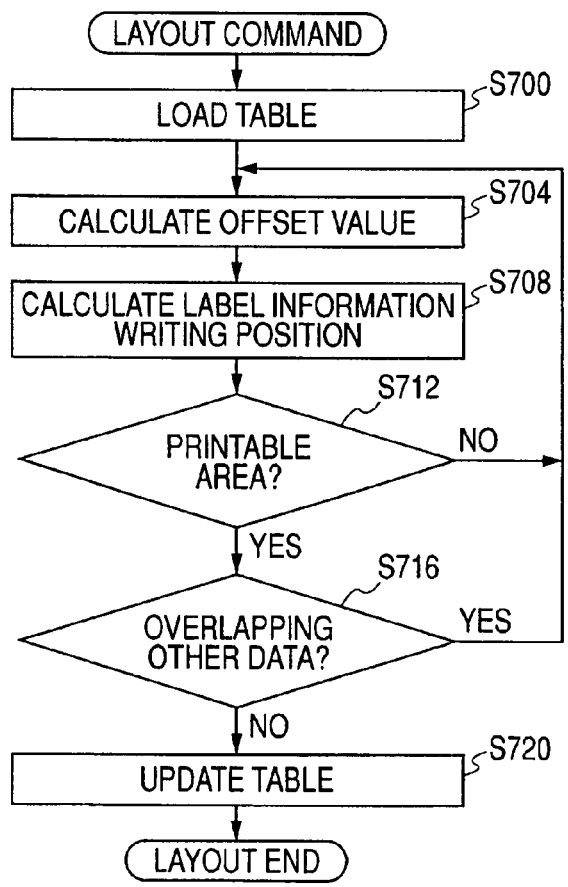
FIG. 19 is an explanatory diagram showing a table structure of print data.
FIG. 20 is a flow chart showing a flow of the operation of the layout generating section.

FIG. 18 is an explanatory diagram showing an example of a printing area of the label information. FIG. 19 is an explanatory diagram showing a table structure of the print data. Hereinafter, the print data according to the present embodiment will be explained with reference to FIGS. 18 and 19.

The case in which the label information A through the label information D have already been printed on the optical disk 200 as shown in FIG. 18 is considered. In this case, it is possible to use printing area data, which shows the area where the label information has already been printed using coordinates as shown in FIG. 19, as the print data instead of using the label information A through the label information D directly as the print data.

In more detail, the rectangular printing area of the label information A represented in the X-Y coordinate system can be described using the coordinate (400, 100) of one of the apexes, the length (700) of the printing area in the X-axis direction and the length (180) thereof in the Y-axis direction taking the one of the apexes as the starting point. Similarly, it is also possible that the printing areas of the label information B through the label information D are described using the X-Y coordinate system, and used as the print data.

It should be noted that the print data can be described using the coordinate of one of the apexes of the rectangular printing area of the label information and the coordinate of another of the apexes thereof diagonally opposite each other. Further, although "Data_001.JPG" through "Data_004.JPG" are provided to the print data of the label information A through the label information D as the respective file names, there is no need for limiting the file names to them.

Hereinafter, the layout generating section 166 operating in accordance with such print data will be explained with reference to FIG. 20.

FIG. 20 is a flow chart showing a flow of the operation of the layout generating section 166. Firstly, the layout generating section 166 loads the print data from the optical disk 200 in response to the input of the instruction for making the layout of new label information (S700). Then, it calculates the offset which is the distance from the printing area of the label information already printed and described either one of the pieces of the print data (S704). In this case, it is also possible that the layout generating section 166 is provided with the minimum value, uses the minimum value as the offset in the first calculation, and uses a value obtained by adding a predetermined value to the minimum value as the offset in the later calculation. Further, it can be arranged that the offset value is input by the user. It should be noted that the direction of the offset can be the X-axis direction or the Y-axis direction.

Subsequently, the layout generating section 166 determines whether or not the printing area of the new label information tentatively determined base on the offset obtained in the step S704 is in the printable area of the optical disk 200 (S712). It should be noted that the printable area denotes a doughnut-shaped area on the label side of the optical disk 200 between the center hole 210 and the frame on the outermost circumference of the optical disk 200. If it is judged that it is not in the printable area, the process returns to the step S704 to calculate the offset once again.

If it is judged in the step S712 that the tentatively determined printing area of the new label information is in the printable area of the optical disk 200, whether or not there is an overlap between the printing area of the new label information and the printing areas of all pieces of label information already printed and loaded in the step S700. If it is judged that there is an overlap between the printing area of the new label information and the printing area of the label information printed already, the process returns to the step S704 to calculate the offset once again.

If it is judged in the step S716 that there is no overlap between the tentatively determined printing area of the new label information and the printing areas of all pieces of the label information already printed and loaded in the step S700, it determines the tentatively determined printing area of the new label information as the final printing area of the new label information. Further, it describes the final printing area of the new label information in the X-Y coordinate system as the print data, and updates the table of the print data to terminate the process (S720).

FIGS. 21A through 21D show conditions through which the layout generating section 166 described above sequentially adds the descriptions of the label information A through the label information G. Firstly, if the label information A is printed as shown in FIG. 21A, the label information B to be added next is printed with the offset d from the label information A in the Y-axis direction as shown in FIG. 21B. Similarly to the above, if it is attempted to add the label information D and the printing area is searched after the label information C is added, the label information D runs off the printable area as shown in FIG. 21C. Therefore, the layout generating section 166 searches the printing area for the label information D with the offset from the label information C in the X-axis direction and the Y-axis direction, and determines it to the position of the label information D illustrated with the solid line shown in FIG. 21C. Then, the printing areas for the label information E through the label information G are sequentially determined in the Y-axis direction from the label information D as shown in FIG. 21D.

It should be noted that the X-axis direction above denotes the direction along the X-axis (horizontal direction in FIGS. 21A through 21D), and the Y-axis direction denotes the direction along the Y-axis (perpendicular to the X-axis direction). Further, the print data can be represented using the R-θ polar coordinate system instead of the X-Y coordinate system. For example, by replacing the X coordinate in the table structure shown in FIG. 19 with the θ coordinate, the Y coordinate with the R coordinate, the X size with the θ coordinate, and the Y size with the R coordinate, the print method described above can be applied.

As described above, the optical disk drive 100 according to the present embodiment is capable of generating the layout of the new label information so as not to overlap the already printed label information while suppressing the amount of print data. Further, since there is no need for developing the same print data as the actual label information such as images and character strings when generating the layout, the amount of calculation can be reduced to achieve quick operations.

Third Embodiment

Hereinafter, the optical disk drive 100 according to a third embodiment of the present invention will now be explained. It should be noted that the configuration elements and operations of the optical disk drive 100 except the print data and the layout generating section 166 are substantially the same as the configuration elements and the operations of the optical disk drive 100 explained in the first embodiment, and accordingly the explanations therefor will be omitted.

The layout generating section 166 of the optical disk drive 100 according to the present embodiment is capable of more simply discriminating the printed area from the non-printed area when printing the label information by previously sectionalizing the label side.

Figures 22A, 22B:
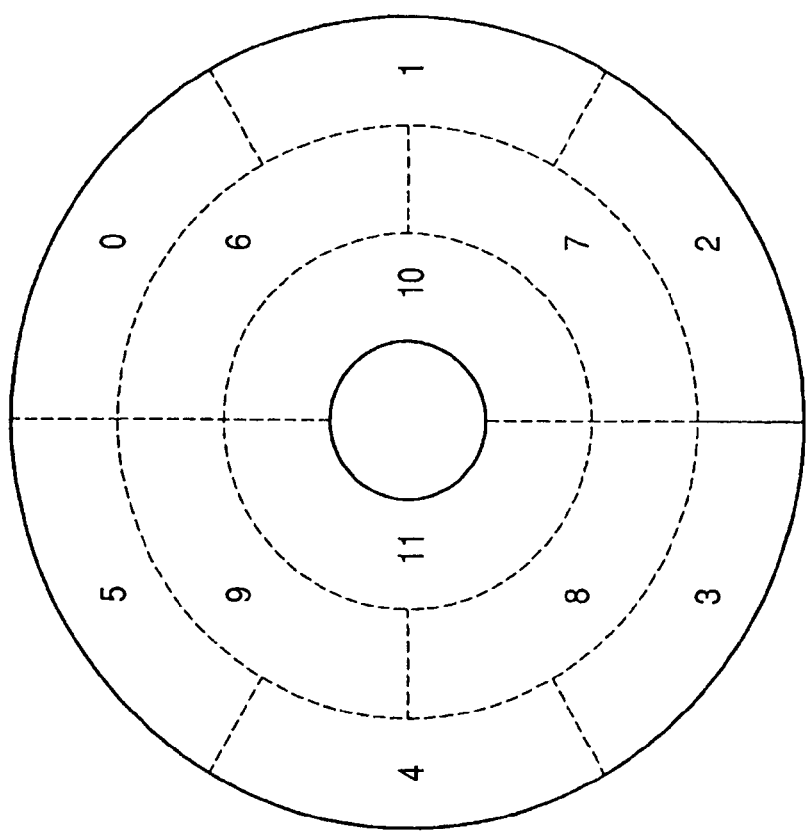
FIGS. 22A and 22B are explanatory diagram for explaining the configuration of the print data according to the present embodiment.

FIGS. 22A and 22B are explanatory diagrams for explaining the print data structure according to the present embodiment. FIG. 22A shows a partitioning pattern of the label side, and FIG. 22B shows the table structure of the print data.

FIG. 22A shows the condition in which the label side of the optical disk 200 is partitioned into 12 areas, namely sector 0 through sector 11. The label side is partitioned in the radial direction into three sections, namely an outermost periphery section, an intermediate section, and the innermost periphery section, and further, in accordance with the rotational angle, the outermost periphery section is partitioned into 6 sectors, the intermediate section is partitioned into 4 sectors, and the innermost section is partitioned into 2 sectors. Each of the sectors thus partitioned is identified by providing a number, and in the illustrated example, the sectors in the outermost periphery section are provided with sector 0 through sector 5, the sectors in the intermediate section are provided with sector 6 through sector 9, and the sectors in the innermost section are provided with sector 10 and the sector 11.

Further, as shown in FIG. 22B, each of the sectors is provided with the correspondence to the information representing whether it has already been printed or it is not printed, and recorded on the recording side of the optical disk 200 as the print data. Still further, it is possible to arrange that the content of the label information such as a picture or a character string is also recorded together if necessary. The illustrated example shows the case in which the sector 0 through the sector 3 are provided with the label information printed thereon, and the sector 4 through the sector 11 are the non-printed areas. It should be noted that the partitioning pattern of the label side is not limited to the illustrated example, but can also be partitioned into a number of rectangular areas or circular areas.

Hereinafter, the operation of the layout generating section 166 will be explained with reference to FIG. 23.

Figure 23:
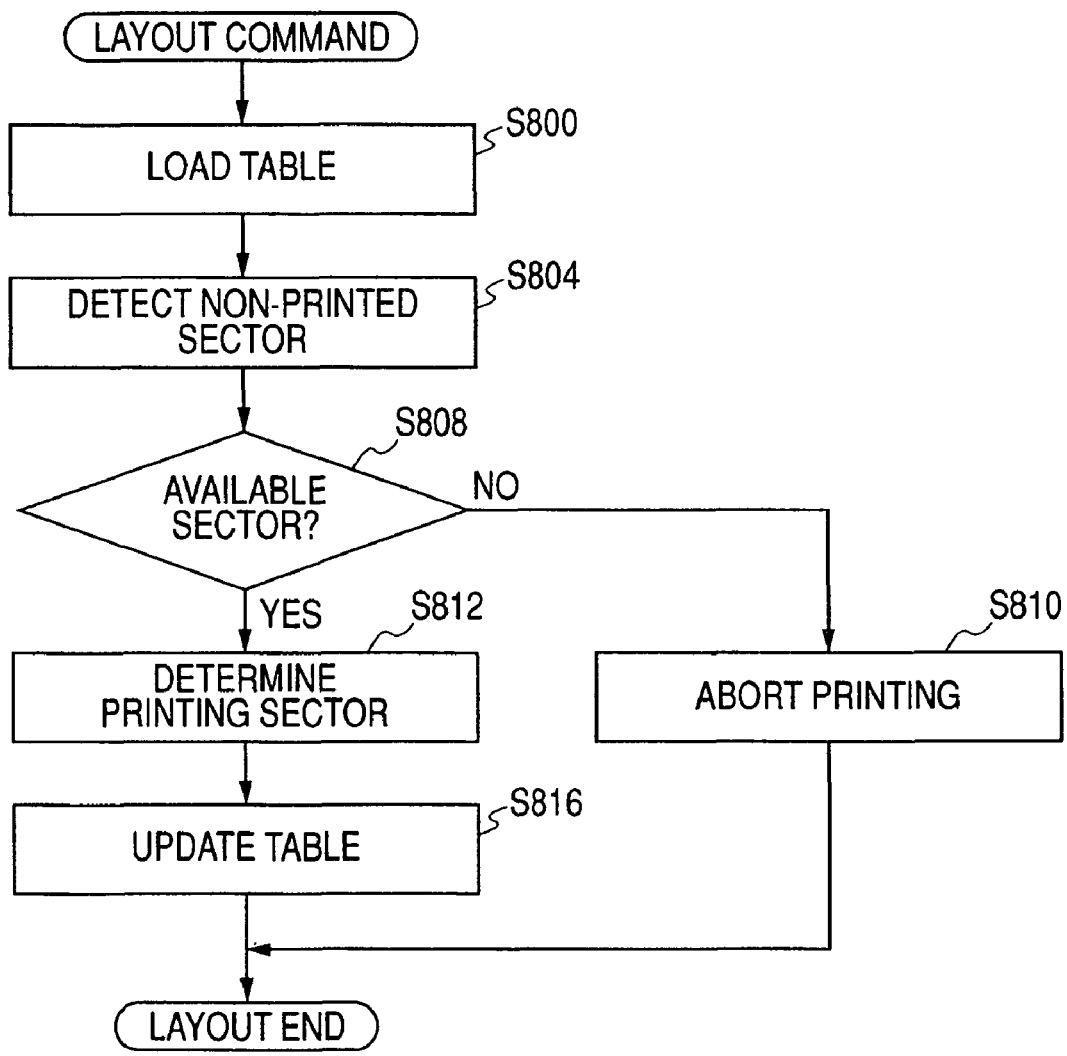
FIG. 23 is a flow chart showing a flow of the operation of the layout generating section.

FIG. 23 is a flow chart showing a flow of the operation of the layout generating section 166. The layout generating section 166 loads the table of the print data in response to input of the instruction for generating the layout (S800). Then, it detects the sector on which the label information has not been printed yet (S804). Subsequently, it determines whether or not the non-printed sector exists (S808), and if it judges that there is no non-printed sector, it aborts the printing process (S810).

If it judges in the step S808 that the non-printed sector exists, it determines the sector on which the label information is newly added out of the non-printed sectors (S812). The determination can be made automatically by the layout generating section 166 or can be made in accordance with the selection of the user. Finally, it updates the table of the print data to change the state of the determined sector to "printed" and terminates the layout generation (S816).

It should be noted that other layout items than the printing area, such as the font or size of the characters can be automatically determined by the layout generating section 166 or can be determined in accordance with the selection of the user. Further, the data of the sector areas can be held by the layout generating section 166, or recorded on the optical disk 200, or recorded on the external storage device.

As described above, by previously partitioning the label side into 1 or a plurality of sectors, the layout generating section 166 of the optical disk drive 100 according to the present embodiment can further simply discriminates the printed area from the non-printed area for printing the label information.

Although the explanation is presented as above regarding the preferable embodiments of the invention with reference to the accompanying drawings, it is obvious that the invention is not limited to such embodiments. It is obvious that those skilled in the art can perceive various modified examples or corrected examples within the scope of the appended claims, which should be understood as obviously within the scope of the invention.

For example, the print data can also be recorded on the external storage device instead of the recording side of the optical disk 200. In this case, the interface section 160 performs communication of the print data between the optical disk 100 and the external storage device. According to such a configuration, it becomes possible to record a larger amount of data signals other than the print data on the optical disk 200.

Further, each of the steps of the printing process of the label information or recording reproducing device in the present specification is not always required to be processed sequentially in the order as described in the flowchart, but can include processes executed in parallel or independently (e.g., parallel processing or a process by an object).

It should be understood by those skilled in the art that various modifications, combinations, sub-combinations, and alterations may occur depending on design requirements and other factors insofar as they are within the scope of the appended claims or the equivalents thereof.

What is claimed is:

1. A recording medium processing device comprising:
a printing section to print visible information on a non-recording side of a recording medium, wherein the printing section uses a rotational angle detected based on address information on a recording side of the recording medium;
a data processing section to retrieve print data in which the recording medium and visible information printed and/or to be printed on the non-recording side of the recording medium are associated with each other; and
a print configuration section to determine a printing area of the visible information to be printed on the non-recording side of the recording medium based on the print data retrieved by the data processing section.

2. The recording medium processing device according to claim 1, wherein
the print data is recorded on a recording side of the recording medium.

3. The recording medium processing device according to claim 1, further comprising a recording section to record the print data.

4. The recording medium processing device according to claim 1, wherein the print data is image data of the non-recording side including the visible information printed and/or to be printed on the non-recording side of the recording medium.

5. The recording medium processing device according to claim 1, wherein the print data is printing area data representing an area of the visible information printed and/or to be printed on the non-recording side of the recording medium.

6. The recording medium processing device according to claim 1, wherein the print data is partitioning data representing whether or not the visible information has already been printed and/or will be printed for every sector of the previously partitioned non-recording side of the recording medium.

7. The recording medium processing device according to claim 1, wherein the address information is contained in one or more physical sectors on a data area.

8. A printing method comprising acts of:
inputting an instruction of printing visible information on a non-recording side of a recording medium;
retrieving print data in which the recording medium and visible information already printed and/or to be printed on the non-recording side of the recording medium are associated with each other;
determining a printing area of the visible information to be printed on the non-recording side of the recording medium based on the print data; and
printing the visible information on the non-recording side of the recording medium, wherein the act of printing uses a rotational angle detected based on address information on a recording side of the recording medium.

9. A non-transitory computer-readable medium with a computer program stored thereon for instructing a computer to function as a recording medium processing device comprising:
a printing section to print visible information on a non-recording side of a recording medium, wherein the printing section uses a rotational angle detected based on address information on a recording side of the recording medium;
a data processing section to retrieve print data in which the recording medium and visible information printed and/or to be printed on the non-recording side of the recording medium are associated with each other; and
a print configuration section to determine a printing area of the visible information to be printed on the non-recording side of the recording medium based on the print data retrieved by the data processing section.

* * * * *